(12) United States Patent
Kanai

(10) Patent No.: US 7,284,086 B2
(45) Date of Patent: Oct. 16, 2007

(54) STORAGE DEVICE CONTROLLING DEVICE AND CONTROL METHOD FOR STORAGE DEVICE CONTROLLING DEVICE

(75) Inventor: Hiroki Kanai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 129 days.

(21) Appl. No.: 10/771,465

(22) Filed: Feb. 5, 2004

(65) Prior Publication Data
US 2005/0097273 A1 May 5, 2005

(30) Foreign Application Priority Data
Oct. 29, 2003 (JP) ............... 2003-368591

(51) Int. Cl.
G06F 12/00 (2006.01)
(52) U.S. Cl. ...................... 711/112; 711/154
(58) Field of Classification Search ................. 711/112
See application file for complete search history.

(56) References Cited

U.S. PATENT DOCUMENTS 5,640,596 A * 6/1997 Takamoto et al. ............ 710/21
6,484,245 B1 * 11/2002 Sanada et al. ............... 711/164
6,516,390 B1 2/2003 Chilton et al.
6,646,947 B2 11/2003 Fukui et al.
2002/0152339 A1 10/2002 Yamamoto .................... 710/36
2003/0023784 A1 1/2003 Matsunami et al.
2004/0128456 A1 7/2004 Kobayashi et al.
2004/0139168 A1 7/2004 Tanaka et al.

FOREIGN PATENT DOCUMENTS

JP 2003345515 12/2003

* cited by examiner

Primary Examiner—Brian R. Peugh
Assistant Examiner—Matthew Bradley
(74) Attorney, Agent, or Firm—Mattingly, Stanger, Malur & Brundidge, P.C.

(57) ABSTRACT

A storage device controller has a channel controller; a disk controller; and a first memory for storing data delivered between the channel controller and the disk controller. The channel controller has a circuit board on which a first processor, a file access processor having a second processor and a second memory, a data transfer device and a third memory are formed. The second processor transmits information indicating the storage position of data in the second memory to the first processor, the first processor writes into the third memory data transfer information containing information indicating the storage position of data in the first memory and information indicating the storage position of the data in second memory, and the data transfer device reads out data transfer information from the third memory and controls the data transfer between the first memory and the second memory on the basis of data transfer information thus read out.

4 Claims, 21 Drawing Sheets

162a PHYSICAL DISK MANAGEMENT TABLE

| DISK NUMBER | CAPACITY | RAID | USE CONDITION |
|---|---|---|---|
| #001 | 100GB | 5 | OCCUPIED |
| #002 | 100GB | 5 | OCCUPIED |
| #003 | 100GB | 5 | OCCUPIED |
| #004 | 100GB | 5 | OCCUPIED |
| #005 | 100GB | 5 | OCCUPIED |
| #006 | 50GB | – | UNOCCUPIED |
| ⋮ | ⋮ | ⋮ | ⋮ |

162b LU MANAGEMENT TABLE

| LU NUMBER | PHYSICAL DISK | CAPACITY | RAID |
|---|---|---|---|
| #1 | #001,#002,#003,#004,#005 | 100GB | 5 |
| #2 | #001,#002,#003,#004,#005 | 300GB | 5 |
| #3 | #006,#007, | 200GB | 1 |
| ⋮ | ⋮ | ⋮ | ⋮ |

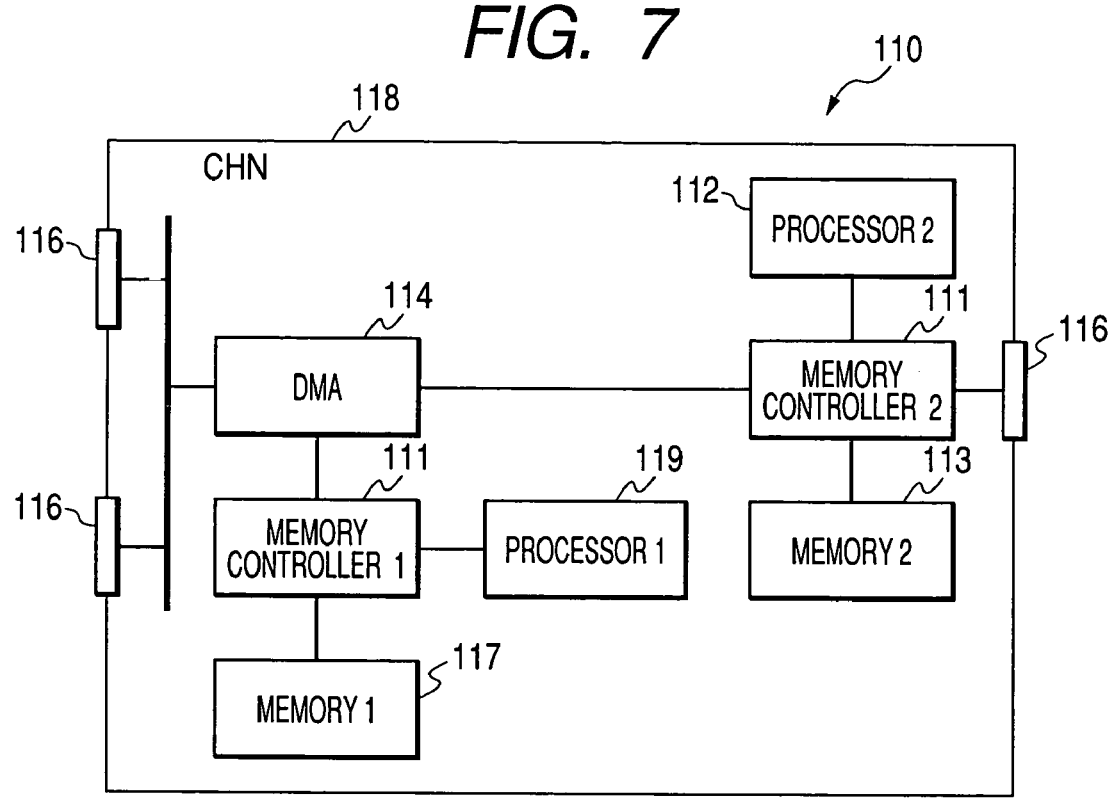
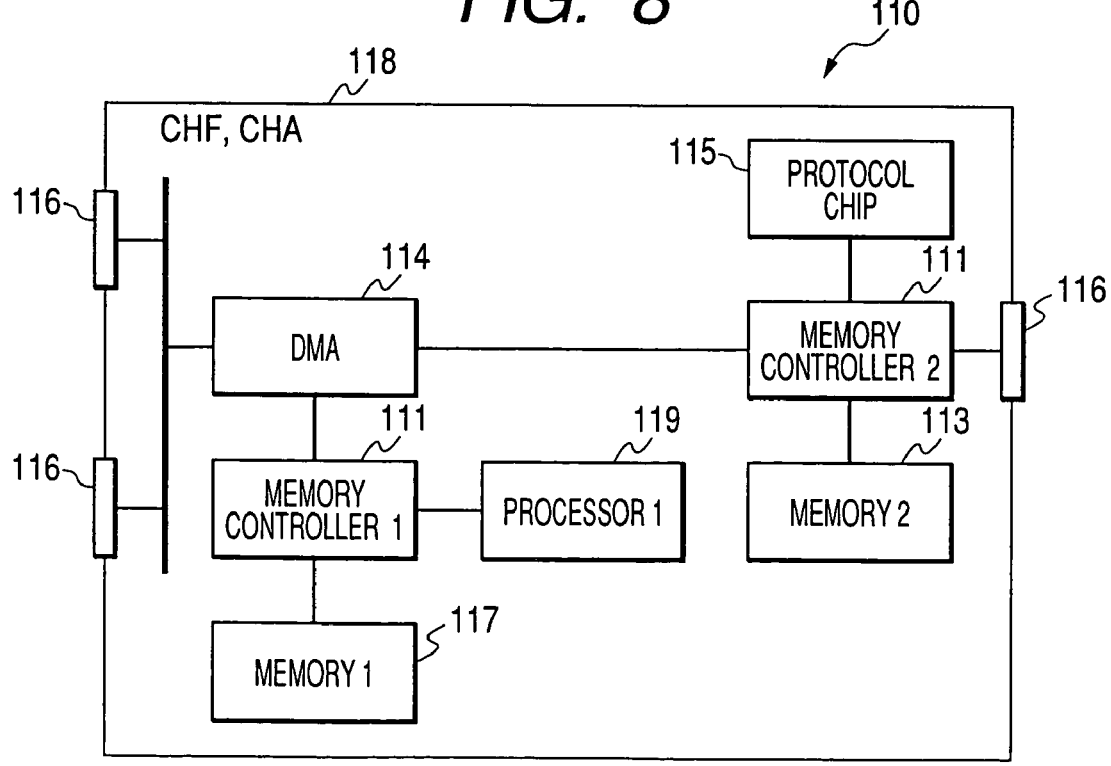

METADATA

| FILE NAME | HEAD ADDRESS | CAPACITY | OWNER | RENEWAL TIME |
|---|---|---|---|---|
| A | 7BSA | 200MB | X | 0 : 00 |
| B | 05BF | 50MB | X | 7 : 57 |
| C | 1F30 | 100MB | Y | 9 : 15 |
| D | 470B | 100MB | Z | 15 : 20 |
| ⋮ | ⋮ | ⋮ | ⋮ | ⋮ |

FILE LOCK TABLE

| FILE NAME | LOCK STATE |
|---|---|
| A | UNDER LOCK |
| B | — |
| C | — |
| D | UNDER LOCK |
| ⋮ | ⋮ |

722

LU LOCK TABLE

| LU | LOCK STATE |
|---|---|
| SHARING | — |
| 1 | UNDER LOCK |
| 2 | — |
| ⋮ | ⋮ |

STORAGE DEVICE CONTROLLING DEVICE AND CONTROL METHOD FOR STORAGE DEVICE CONTROLLING DEVICE

CROSS-REFERENCES TO RELATED APPLICATIONS

This application relates to and claims priority from Japanese Patent Application No. 2003-368591, filed on Oct. 29, 2003, the entire disclosure of which is incorporated herein by reference.

BACKGROUND OF THE INVENTION

The present invention relates to a storage device controller, and a method of controlling the storage device controller.

The amount of data to be handled in a computer system has recently increased. In connection with this increase in the data amount, a large-scale storage system equipped with a storage volume which is managed by a RAID (Redundant Arrays of Inexpensive Disks) system for supplying enormous storage resources, referred to as a mid-range class or enterprise class, has recently received widespread attention as a storage system for managing large amounts of data. Furthermore, a technique in which information processing devices are connected to a storage system through a dedicated network (Storage Area Network, hereinafter referred to as a "SAN") to enable a large amount of access to the storage system at high speed has been developed to efficiently use and manage vast amounts of data.

Furthermore, a storage system called a NAS (Network Attached Storage) has been developed for mutually connecting a storage system and an information processing device through a network using the TCP/IP (Transmission Control Protocol/Internet Protocol) protocol or the like and for implementing access to data based on a file-name indication from the information processing device.

Such a storage system as described above uses a DMA (Direct Memory Access) transfer technique for eliminating transferring of data through the CPU (Central Processing Unit) in order to increase the data access speed. In order to carry out DMA transfer, the CPU writes into a register equipped to a DMA controller, data transfer information needed for data transfer, such as a transfer source storage address, a transfer destination storage address, etc. for data to be transferred, and instructs the DMA controller to start the data transfer. Accordingly, the data transfer is carried out by the DMA controller without involving the CPU in the data transfer (see JP-A-2003-22246).

However, it takes more time to carry out data writing from the CPU into the register of the DMA controller in the data transfer circuit containing the DMA controller as compared with data writing from the CPU into a memory element. Therefore, in a situation in which data transfer occurs frequently, the time needed for the DMA starting processing involving the data writing from the CPU into the register of the DMA controller inhibits an increase in the data access speed.

Furthermore, in a situation in which data input/output control is carried out by using plural CPUs, when data transfer is carried out between memories, each of which is controlled by a respective CPU, the CPU for controlling the DMA controller is required to obtain information on storage addresses, etc. of data in the memories controlled by the other CPUs. Moreover, in a situation in which the data transfer size is different for each memory, the CPU for controlling the DMA controller is required to provide control for adjusting the data transfer size. An increase in the processing load imposed on the CPU for controlling the DMA controller inhibits an increase of the data access speed. Therefore, it has been required to reduce the processing load imposed on the CPU for controlling the DMA controller.

SUMMARY OF THE INVENTION

The present invention has been implemented in view of the foregoing problem, and it has a main object to provide a storage device controller and a method of controlling the storage controller.

In order to achieve the forgoing object, according to a first aspect of the present invention, there is provided a storage device controller comprising a channel controller for receiving a data input/output request based on a file-name indication received from an information processing device through a network and for transmitting/receiving data to/from the information processing device, a disk controller for carrying out input/output control of data stored in a storage volume for storing the data, and a first memory for storing the data delivered between the channel controller and the disk controller. The channel controller is equipped with a first processor for outputting a block-basis I/O request corresponding to the data input/output request and for controlling the first memory; a file access processor, which has a second processor and a second memory controlled by the second processor, and which serves to control the transmission/reception of the data input/output request and the data which is carried out with the information processing device; a data transfer device for controlling data transfer between the first memory and the second memory, and a third memory controlled by the first processor, which are formed on a circuit board. Wherein, the second processor transmits information indicating the storage position of the data in the second memory to the first processor; the first processor writes into the third memory data transfer information containing information indicating the storage position of the data in the first memory and information indicating the storage position of the data in the second memory; and the data transfer device reads out the data transfer information from the third memory and controls the data transfer between the first memory and the second memory on the basis of the data transfer information thus read out.

Here, the storage device controller is defined as a device for controlling the reading/writing of data into the data-stored storage volume in accordance with a data input/output request received from the information processing device. The information processing device is defined as information equipment, such as a computer or the like, which is equipped with a CPU and a memory. When the information processing device is connected to the storage system containing the storage device controller and the storage volume or another information processing device through a network, such as a LAN (Local Area Network), SAN or the like, it transmits/receives data to/from the storage system or the other information device by communicating with the storage system or the other information device. The storage volume is a storage resource for storing data, and it contains the physical volume corresponding to a physical storage area supplied from a disk drive, such as a hard disk device or the like, and the logical volume corresponding to a storage area logically set on the physical volume.

The file access processor transmits/receives data based on a file-name indication to/from the information processing device. The functions of the file access processor are supplied from an operating system executed by the second processor and software, such as a NFS (Network File System) or the like, which is operated on the operating system.

The first processor contains, as a hardware element, an IC (Integrated Circuit) which is independent of the second processor serving as the hardware element of the file access processor, and it controls the first memory. The first processor outputs a block-basis I/O request in response to a file-basis data input/output request received from the information processing device by the file access processor. On the basis of the I/O request, the disk controller carries out the input/output control of data stored in the storage volume. The first memory comprises a cache memory to be described later, for example. The data transfer device functions as a DMA controller.

Accordingly, for example, when the file access processor receives a data writing request and writing data based on the file name indication from the information processing device, the writing data is stored in the second memory. The first processor outputs the block-basis write request corresponding to the data writing request based on the file name indication. The data transfer device transfers the writing data stored in the second memory to the first memory. On the basis of the write request, the disk controller reads out the writing data from the first memory, and also writes the writing data into the storage volume on a block basis.

When the file access processor receives the data read-out request based on the file name indication from the information processing device, the first processor outputs the block-basis read request corresponding to the data read-out request based on the file name indication. The disk controller reads out data from the storage volume on a block basis on the basis of the read request, and it also writes the read-out data into the first memory. The data transfer device transfers the read-out data stored in the first memory to the second memory. The file access processor transmits the read-out data stored in the second memory to the information processing device.

The input/output of the data stored in the storage volume is carried out through the communications between the disk controller and the storage volume. The communications between the disk controller and the storage volume may be carried out through a communication path constituting a loop which is set according to FC-AL of fibre channel standards.

When the data transfer device controls the data transfer between the first memory and the second memory, the data transfer device needs to store the storage positions of data in the respective memories (the transfer source address and the transfer destination address for the data concerned) into a register. In the storage device controller of this invention, the data transfer information containing the information indicating the storage positions of the data is written in the third memory by the first processor. The data transfer device reads out the data transfer information from the third memory and stores it into the register. Therefore, the first processor writes the data transfer information, not into the register of the data transfer device, which requires a relatively long access time, but into the third memory, which requires only a relatively short access time, and then shifts to execution of the subsequent processing. Accordingly, the idle time of the first processor (standby time for writing completion) can be reduced, and the first processor can be efficiently operated. Therefore, the speed of the data reading/writing for the data input/output request from the information processing device can be increased.

As described above, the data reading/writing speed can be increased. The increase in data reading/writing speed greatly contributes to an increase in amount of data which is able to be handled in the information processing system and also to enhancement in the processing performance of the overall information processing system under a use condition of a recent storage system in which data input/output requests are successively transmitted from many information processing devices on-line and on a real-time basis.

The forgoing problems and the solutions thereof as provided by this invention will be more apparent from the following "Detailed Description of the preferred Embodiments" and accompanying drawings.

BRIEF DESCRIPTION OF THE DRAWINGS

FIG. 7 is a block diagram showing a CHN according to the embodiment;

FIG. 8 is a block diagram showing a CHF, CHA according to the embodiment;

FIG. 13 is a diagram showing the meta data according to the embodiment;

FIG. 14 is a diagram showing the lock table according to the embodiment;

DETAILED DESCRIPTION OF THE PREFERRED EMBODIMENTS

Figure 1:
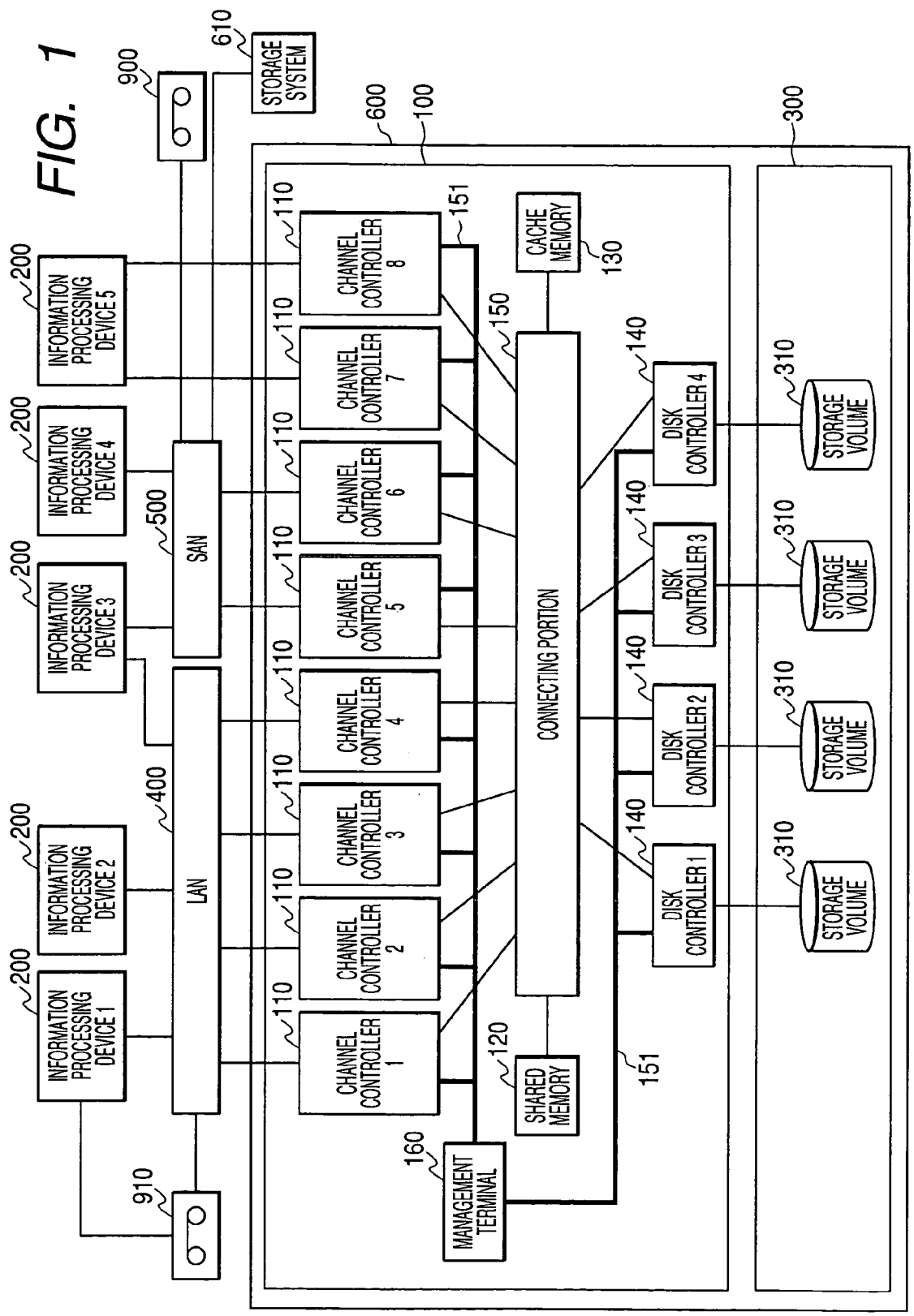
FIG. 1 is a block diagram showing the overall construction of a storage system according to an embodiment of the present invention.

A preferred embodiment according to the present invention will be described hereunder with reference to the accompanying drawings.

First Embodiment

[Overall Construction]

First, the overall construction of a storage system 600 containing a storage device controller 100 according to an embodiment of the present invention will be described with reference to the block diagram of FIG. 1.

The storage system 600 is equipped with a storage device controller 100 and a disk drive device 300. The storage device controller 100 controls the disk drive device 300 according to a command received from an information processing device 200. For example, the storage system 600 receives a data input/output request from the information processing device 200, and it reads/writes data stored in a storage volume 310 equipped to the disk drive device 300. The storage volume 310 is defined as a storage resource for storing data, which contains a physical volume serving as a physical storage area supplied by a disk drive, such as a hard disk device or the like, and a logical volume serving as a storage area set logically on the physical volume. The storage volume 310 or the logical volume will also hereinafter be referred to as a "LU (Logical Unit)". The storage device controlling device transmits/receives various commands for managing the storage system 600 to/from the information processing device 200.

The information processing device 200 constitutes information equipment, such as a computer or the like, which is equipped with CPU and a memory. Various kinds of programs are executed by the CPU equipped in the information processing device 200 to thereby implement various functions. The information processing device 200 may be a personal computer or a work station, or a main frame computer.

In FIG. 1, information processing devices 1 to 3 (200) are connected to the storage device controller 100 through a LAN (Local Area Network) 400. The LAN 400 may be the Internet or a dedicated network. The communications carried out between the information processing devices 1 to 3 (200) and the storage device controlling device 100 through the LAN 400 are carried out according to the TCP/IP protocol, for example. A data access request based on a file name indication (data input/output request on the basis of a file-name indication, hereinafter referred to as a "file access request") is transmitted from the information processing devices 1 to 3 (200) to the storage system 600.

A backup device 910 is connected to LAN 400. Specifically, the backup device 910 may be a disc type device, such as a MO (Magneto-optical Disc), CD-R (Compact Disc-Recordable), DVD-RAM (digital Video Disc-Random Access Memory) or the like, or it may be a tape type device, such as a DAT (Digital Audio Tape) tape, a cassette tape, an open tape, a cartridge tape or the like. The backup device 910 communicates with the storage device controller 100 through the LAN 400 to store backup data consisting of data stored in the disk driving device 300. Furthermore, the backup device 910 may be connected to the information processing device 1 (200). In this case, it can achieve the backup of data stored in the disk driving device 300 through the information processing device 1 (200).

The storage device controller 100 is equipped with channel controllers 1 to 4 (110). The storage device controller 100 communicates with the information processing devices 1 to 3 (200) and the backup device 910 through the LAN 400 under control of the channel controllers 1 to 4 (110). Each of the channel controllers 1 to 4 (110) receives a file access request transmitted from each of the information processing devices 1 to 3 (200) through LAN 400 and transmits/receives data to/from the information processing device. That is, a network address (for example, IP address) on the LAN 400 is allocated to each of the channel controllers 1 to 4 (110). Therefore, each channel controller individually behaves as a NAS, and, thus, each of the channel controllers 1 to 4 can provide the information processing devices 1 to 3 (200) with services of a NAS as if independent NASs exist. The channel controllers 1 to 4 (110) will be also referred to as "CHN 110".

As described above, the storage system 600 is equipped with the channel controllers 1 to 4 (110) which can individually provide services as NASs to one storage system 600, and thus NAS services which have been hitherto individually operated by independent computers can be collectively operated in one storage system 600. Accordingly, the centralized management of the storage system 600 is possible, and maintenance works, such as various kinds of setting/control, trouble management, version management, etc., can be efficiently performed.

The channel controllers 1 to 4 (110) of the storage device controller 100 according to this embodiment is implemented by integrally unitized hardware formed on a circuit board 180 and software, such as an operating system (hereinafter referred to as "OS"), implemented by the hardware, application programs operating on the OS, etc. as described later. As described above, in the storage system 600 of this embodiment, the functions which have been hitherto mounted as a part of hardware are implemented by the software. Therefore, according to the storage system 600 of this embodiment, a flexible system operation can be performed, and more delicate services can be provided in response to various rapidly-varying users' needs.

The information processing devices 3 and 4 (200) are connected to the storage device controlling device 100 through SAN 500. SAN 500 is a network through which data is transmitted/received between the storage device controlling device 100 and the information processing devices 3, 4 (200) on a block basis, the block serving as a management unit of data in a storage area provided by the disk driving device 300. The communications between the information processing devices 3, 4 (200) and the storage device controller 100 through SAN 500 are generally carried out according to a fibre channel protocol. A block-basis data access request (hereinafter referred to as "block access request") is transmitted from each of the information processing devices 3, 4 (200) to the storage system 600 according to the fibre channel protocol.

A SAN-adapted backup device 900 is connected to SAN 500. The SAN-adapted backup device 900 communicates with the storage device controller 100 through SAN 500 to store the backup data consisting of data stored in the disk driving device 300.

The storage device controller 100 is equipped with channel controllers 5 to 6 (110). The storage device controller 100 communicates with the information processing devices 3 to 4 (200) and the SAN-adapted backup device 900 through SAN 500 by the channel controllers 5 to 6 (110). The channel controllers 5 to 6 will be also referred to as "CHF".

The information processing device 5 (200) is connected to the storage device controller 100 without passing through any network such as LAN 400, SAN 500 or the like. The information processing device 5 (200) may be a main frame computer. The communications between the information processing device 5 (200) and the storage device controller 100 are carried out according to a communication protocol such as FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark) or the like. A block access request is transmitted from the information processing device 5 (200) to the storage system 600 according to these communication protocols.

The storage device controller 100 communicates with the information processing device 5 (200) under control of the channel controllers 7 and 8 (110). The channel controllers 7 and 8 (110) will also hereinafter be referred to as "CHA".

SAN 500 is connected to another storage system 610 that is set up at a remote place (secondary site) from a setup place of the storage system 600 to protect data when a disaster occurs or the like. The storage system 610 is used as a device at a data copy destination in a replication or remote copy function. The storage system 610 may be connected to the storage system 600 through a communication line, such as an ATM or the like, in place of SAN 500. In this case, as the channel controller 110 is provided with an interface (channel extender) to use the above communication line.

As described above, in the storage system 600 of this embodiment, CHN 110, CHF 110 and CHA 110 can be mounted in the storage system 600 as so to coexist with one another. Accordingly, a storage system that is connected to different kinds of networks can be implemented. Specifically, this is a SAN-NAS integral storage system in which the storage system 600 is connected to a LAN 400 by using a CHN 110 and also is connected to a SAN 500 by using a CHF 110.

[Storage Volume]

The disk driving device 300 is equipped with many disk drives, and thus it provides a large capacity storage area to the information processing device 200. The disk driving device 300 may be designed so that a disc array is constructed by plural disk drives. In this case, the storage area provided to the information processing device 200 may be provided from plural disk drives managed by a RAID system.

The storage device controlling device 100 and the disk driving device 300 may be directly connected to each other as shown in FIG. 1, or they may be connected to each other through a network. Furthermore, the disk driving device 300 may be constructed integrally with the storage device controller 100.

The LU 310 equipped to the disk driving device 300 contains a user LU 310 that is accessible from the information processing device 200, a system LU 310 that is used to control the channel controllers 110, etc. An operating system executed in the CHN 110 is also stored in the system LU 310.

[Storage Device Controlling Device]

The storage device controller 100 is equipped with channel controllers 110, a shared memory. 120, a cache memory (first memory) 130, a disk controller 140, a management terminal 160 and a connecting portion 150.

The channel controller 110 is equipped with a communication interface for making communications with the information processing device 200, and it has a function of transmitting/receiving a data input/output command, etc. to/from the information processing device 200. For example, the CHN 110 receives a file access request from the information processing devices 1 to 3 (200). It finds the storage address of the file, the data length, etc. and outputs an I/O request corresponding to the file access request to access the disk driving device 300, whereby the storage system 600 can provide the information processing devices 1 to 3 (200) with services as a NAS. The I/O request contains the head address of the data, the data length, the access type, such as reading or writing, etc. In the case of the data writing, the I/O request may contain writing data. The output of the I/O request is carried out by the processor 1 (first processor) 119. CHF 110 accepts a block access request based on the fibre channel protocol from the information processing devices 3 to 4 (200), whereby the storage system 600 can provide the information processing devices 3 to 4 (200) with high-speed accessible data storage services. Furthermore, the CHA 110 accepts a block access request based on a protocol such as FICON, ESCON, ACONARC, FIBARC or the like from the information processing device 5 (200), whereby the storage system 600 can also provide a main frame computer such as the information processing device 5 (200) with data storage services.

Each channel controller 110 is connected to the management terminal 160 through an internal LAN 151, whereby micro-programs, etc. executed in the channel controllers 110 and the disk controllers 140 can be transmitted from the management terminal 160 and installed. The construction of the channel controllers 110 will be described later.

The connecting portion 150 mutually connects the channel controllers 110, the shared memory 120, the cache memory 130 and the disk controllers 140 to one another. The communications of data and commands among the channel controllers 110, the shared memory 120, the cache memory 130 and the disk controllers 140 are carried out through the connecting portion 150. The connecting portion 150 is provided as a cross-bar switch, for example. The channel controllers 110 are mutually connected to one another by the connecting portion 150, whereby the communication performance among the channel controllers 110 can be more greatly enhanced as compared with the construction in which NAS servers operating on individual computers are mutually connected to one another through LAN 400. Furthermore, this construction makes possible a high-speed file sharing function and high-speed failed-over.

The shared memory 120 and the cache memory 130 are storage memories shared by the channel controllers 110 and the disk controllers 140. The shared memory 120 is mainly used to store control information, commands, etc., and the cache memory 130 is mainly used to store data.

For example, when a data input/output command received from the information processing device 200 by some channel controller 110 is a writing command, the channel controller 110 concerned writes the writing command into the shared memory 120, and, at the same time, it writes the writing data received from the information processing device 200 into the cache memory 130. The disk controller 140 monitors the shared memory 120, and when it detects that the writing command is written into the shared memory 120, it reads out the writing data from the cache memory 130 according to the command concerned and writes the data into the disk driving device 300.

When a data input/output command received from the information processing device 200 by some channel controller 110 is a read-out command, it is investigated whether data to be read out exists in the cache memory 130. Here, if the data exists in the cache memory 130, the channel controller 110 transmits the data concerned to the information processing device 200. On the other hand, when the data to be read out does not exist in the cache memory 130, the channel controller 110 concerned writes a read-out command into the shared memory 120, and also monitors the shared memory 120. The disk controller 140, which detects that the read-out command has been written into the shared memory 120, reads out the read-target data from the disk driving device 300 and writes the data into the cache memory 130, and it also writes this fact into the shared memory 120. When the channel controller 110 detects that the data to be read out has been written into the cache memory 130, it transmits the data concerned to the information processing device 200.

As described above, data is transmitted/received between the channel controller 110 and the disk controller 140 through the cache memory 130.

In addition to the construction in which the data writing/reading instruction from the channel controller 110 to the disk controller 140 may be indirectly carried out through the shared memory 120, the data writing/reading instruction from the channel controller 110 to the disk controller 140 may be directly carried out through no shared memory 120.

Furthermore, by providing the channel controller 110 with the function of the disk controller 140, the channel controller 110 can read/write data stored in the disk driving device 300.

The disk controller 140 controls the disk driving device 300. For example, the channel controller 110 writes data into the disk driving device 300 according to the data writing command received from the information processing device 200 as described above. The disk controller 140 converts the logical-address-indication based I/O request to LU 310 to the physical-address-indicates based I/O request to a physical disk. Furthermore, when the physical disk in the disk driving device 300 is managed by a RAID system, data access based on the RAID configuration is carried out. The disk controller 140 performs copy management control and backup control on data stored, in the disk driving device 300. Furthermore, the disk controller 140 also controls storage of a copy of data of the storage system 600 at a primary site to another storage system 610 set up at a secondary site (replication function or remote copy function), etc. in order to prevent data loss when a disaster occurs (disaster recovery).

Each disk controller 140 is connected to the management terminal 160 and also to the internal LAN 151, and it is enabled to make mutual communications with them. Accordingly, micro-programs, etc. to be executed in the disk controllers 140 can be transmitted from the management terminal 160 and installed. The construction of the disk controller 140 will be described later.

In this embodiment, the shared memory 120 and the cache memory 130 are equipped independently of the channel controllers 110 and the disk controllers 140, however, this embodiment is not limited to this mode. It is also preferable that the shared memory 120 or the cache memory 130 is dispersively equipped to each of the channel controllers 110 and the disk controllers 140. In this case, the connecting portion 150 can mutually connect the channel controllers 110 and the disk controllers 140, each having the dispersively-equipped shared memory 120 or cache memory 130.

[Management Terminal]

The management terminal 160 is a computer for maintaining/managing the storage system 600. Setting of the physical disk construction in the disk driving device 300, setting of the LU 310, installation of micro-programs to be executed in the channel controllers 110 and the disk controllers 140, etc. can be performed by operating the management terminal 160. Here, expansion/reduction of the physical disk, a change of the RAID construction is (the change from RAID1 to RAID5, etc.) can be performed as a setting of the physical disk construction in the disk driving device 300. Furthermore, a check of the operating state of the storage system 600, the specification of a trouble site, installation of the operating system to be executed in the channel controllers 110, etc. can be also performed from the management terminal 160. Such setting and control are carried out by an operator or the like while a Web page provided from a Web server operating in the management terminal 160 is used as a user interface. The operator or the like can set targets or the contents to be trouble-monitored, set a trouble notification destination, etc. by operating the management terminal 160.

The management terminal 160 may be designed in such a style as to be contained in the storage device controlling device 100 or equipped externally. Furthermore, the management terminal 160 may be a computer which exclusively maintains/manages the storage device controlling device 100 and the disk driving device 300, or it may be a general computer which is brought with the maintenance/management function.

Figures 4, 5, 6:
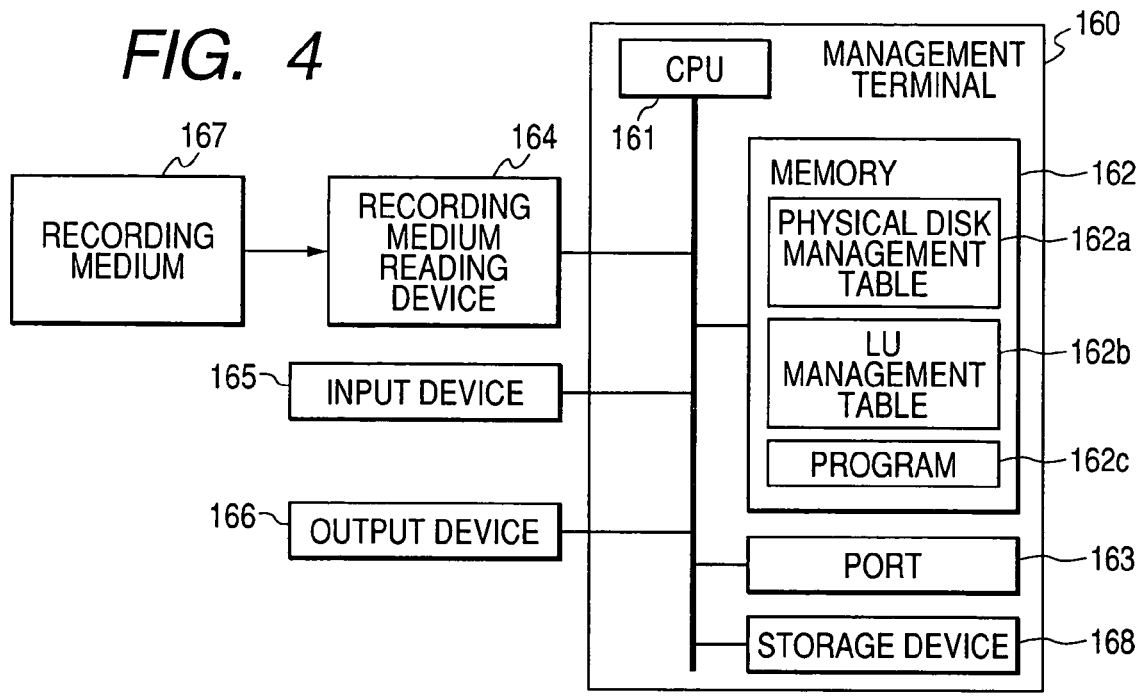
FIG. 4 is a block diagram showing the construction of a management terminal according to the embodiment.
FIG. 5 is a diagram showing a physical disk managing table according to the embodiment.
FIG. 6 is a diagram showing an LU managing table according to the embodiment.

FIG. 4 is a block diagram showing the construction of the management terminal 160.

The management terminal 160 is equipped with a CPU 161, a memory 162, a port 163, a recording medium reading device 164, an input device 165, an output device 166 and a storage device 168.

The CPU 161 controls the overall management terminal 160. It executes a program 162c stored in the memory 162 to implement the function as the Web server. In the memory 162 are stored a physical disk management table 162a, an LU management table 162b and the program 162c.

The physical disk management table 162a is a table for managing the physical disk (disk drive) equipped to the disk driving device 300. The physical disk management table 162a is shown in FIG. 5. Only the physical disks having the disk numbers #001 to #006 out of the many physical disks equipped to the disk driving device 300 are shown in FIG. 5. The capacity, the RAID construction and the use status are shown for each physical disk.

The LU management table 162b is a table for managing the logical volume 310 logically set on the physical disk. The LU management table 162b is shown in FIG. 6. Only the LUs 310 having the LU numbers #1 to #3 out of many LUs 310 set on the disk driving device 300 are shown in FIG. 6. The physical disk number, the capacity and the RAID construction are shown for each LU 310.

The recording medium reading device 164 is a device for reading out programs and data recorded in a recording medium 167. The programs or data read out are stored in the memory 162 or the storage device 168. Accordingly, the program 162c recorded in the recording medium 167 can be read out from the recording medium 167 by using the recording medium reading device 164, it is and stored into the memory 162 or the storage device 168. A flexible disk, CD-ROM, a semiconductor memory or the like may be used as the recording medium 167. The recording medium reading device 164 may be designed to be contained in the management terminal 160 or equipped at the external side. The recording device 168 may be a hard disk device, a semiconductor storage device or the like. The input device 165 is used to effect data input to the management terminal 160 by an operator or the like. For example, a keyboard, a mouse or the like is used as the input device 165. An output device 166 may be a device for outputting information to the outside, and a display, a printer or the like is used as the output device 166. The port 163 is connected to the internal LAN 151, and the management terminal 160 can communicate with the channel controllers 110, the disk controllers 140, etc. through the port 163. The port 163 may be also connected to LAN 400 and a telephone line.

[Outlook View]

Figure 2:
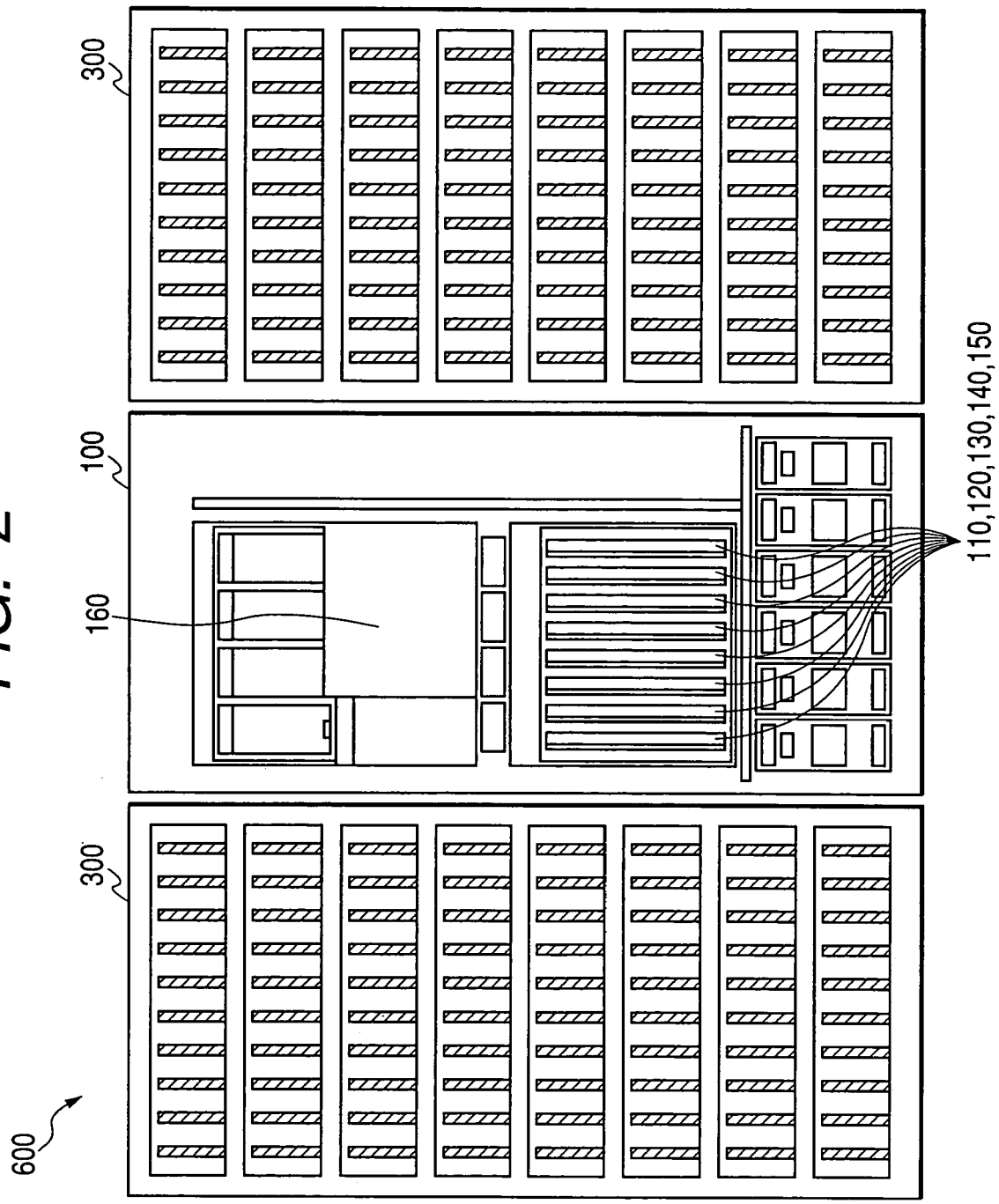
FIG. 2 is a diagram showing the outside appearance of the storage system according to the embodiment.
Figure 3:
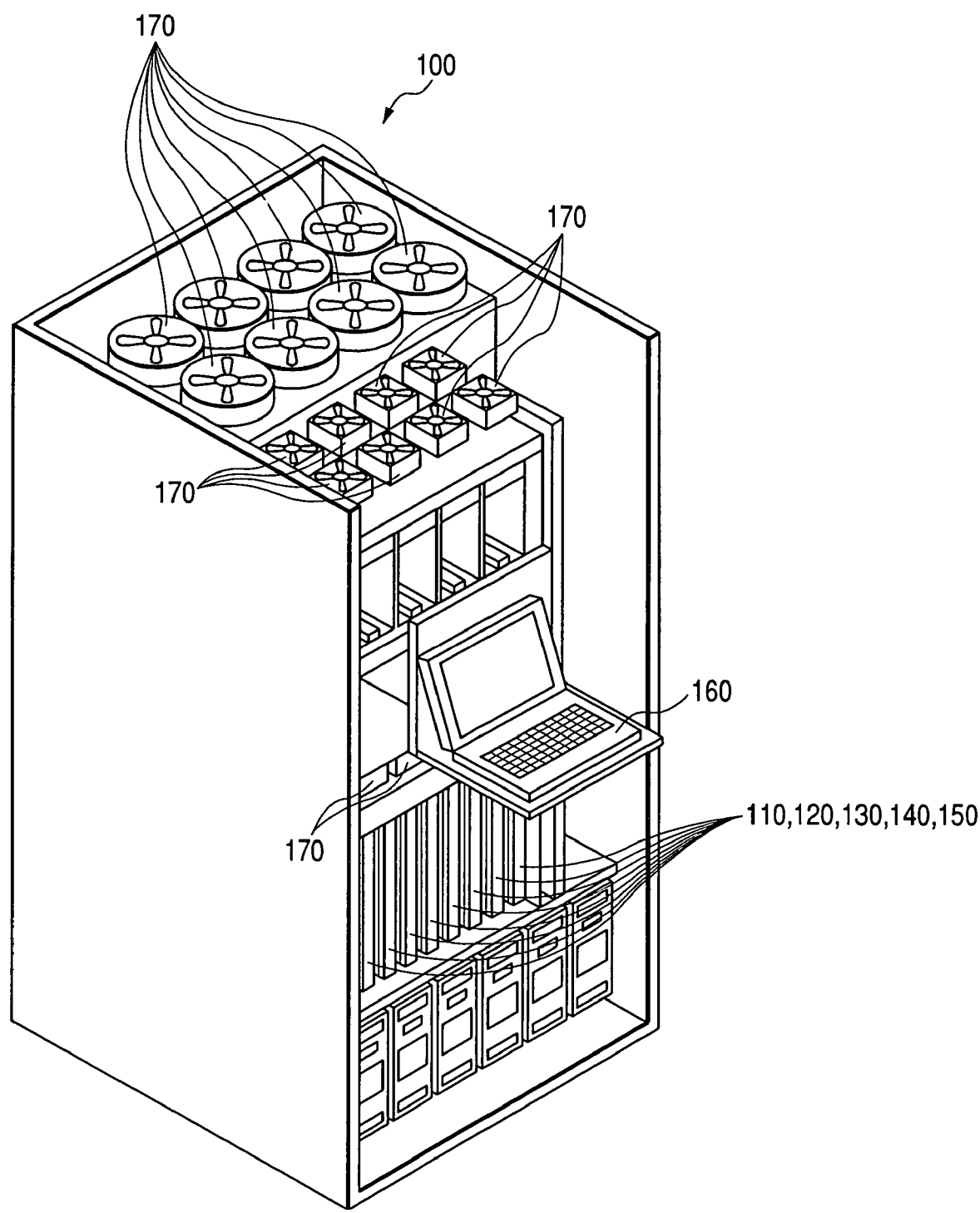
FIG. 3 is a diagrammatic perspective view showing the appearance of a storage device controller according to the embodiment.

Next, FIG. 2 shows the outlook construction of the storage system 600 according to this embodiment, and FIG. 3 shows the outlook construction of the storage device controlling device 100.

As shown in FIG. 2, the storage system 600 of this embodiment is designed in such a style that the storage device controlling device 100 and the disk driving device 300 are respectively accommodated in the respective housings. The housings of the disk driving device 300 are disposed at both the sides of the storage device controller 100.

The storage device controller 100 is equipped with the management terminal 160 at the center portion of the front face thereof. The management terminal 160 is covered by a cover, and the management terminal 160 is allowed to be used by opening the cover as shown in FIG. 3. The management terminal 160 shown in FIG. 3 is designed as a so-called lap top personal computer, however, it may be designed as any type of computer.

At the lower side of the management terminal 160, there are slots in which the channel controllers ho, the disk controllers 140, the cache memory 130, the shared memory 120 and the connecting portion 150 are mounted. Each of the channel controllers 110, the disk controllers 140, the cache memory 130, the shared memory 120 and the connecting portion 150 is designed in the form of a board so as to have a circuit board, and these boards are mounted in the respective slots. Each slot is equipped with guide rails for mounting the corresponding board. By inserting each board into the slot along the guide rails, the channel controllers 110, the disk controllers 140, the cache memory 130, the shared memory 120 and the connecting portion 150 can be mounted in the storage device controller 100. Furthermore, the boards mounted in the respective slots can be removed by pulling them out in the frontward direction along the guide rails. A connector for electrically connecting each board to the storage device controller 100 is equipped at the front surface portion in the depth direction of each slot. The channel controllers 110 include CHN 110, CHF 110 and CHA 110, and all the channel controllers 110 also can be mounted in the same slot because they are compatible with one another in size, connector position, connector pin arrangement, etc.

Figure 12:
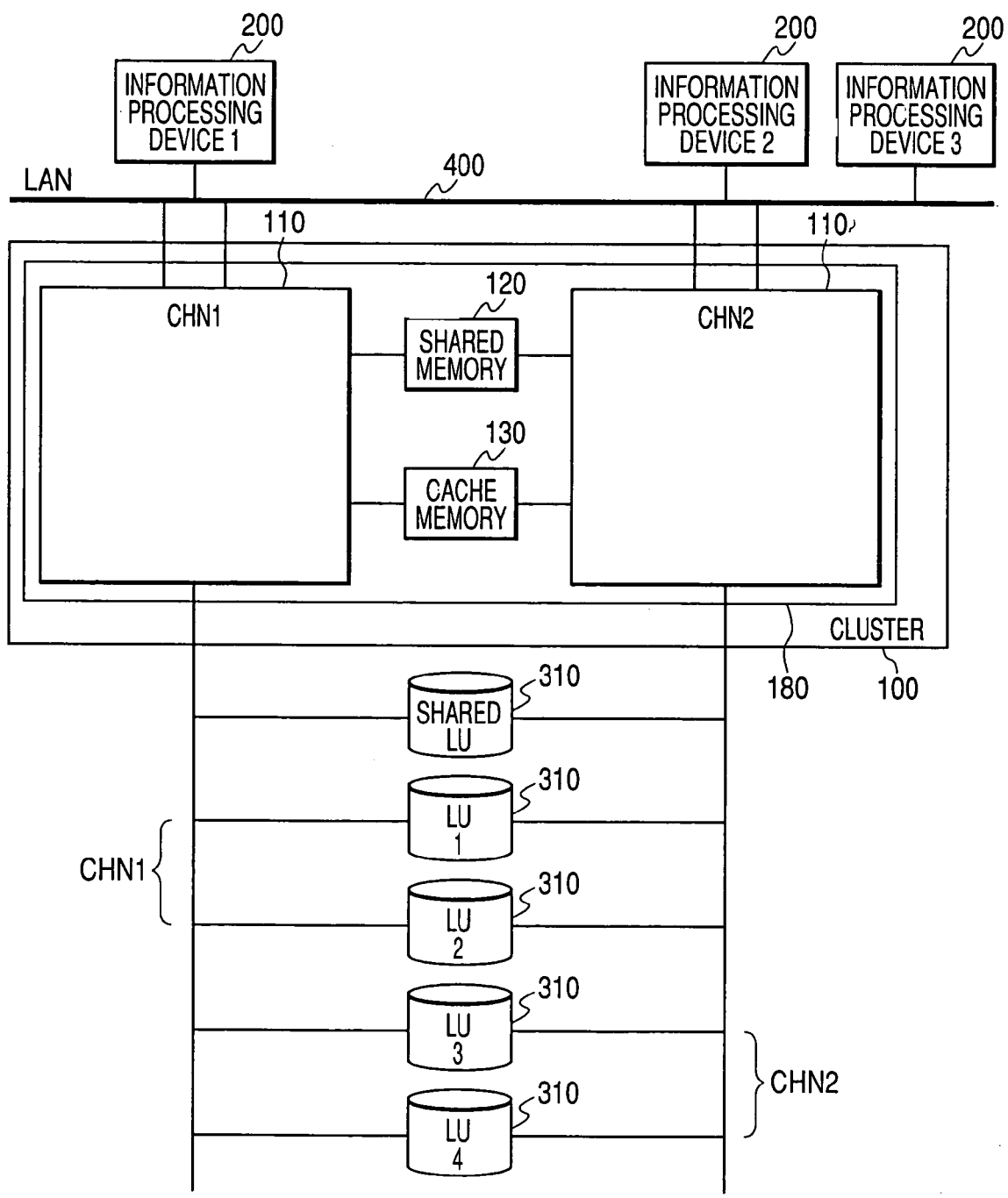
FIG. 12 is a diagram showing a cluster construction of the storage system according to the embodiment.

The plural channel controllers 110 mounted in the slots are the same kinds of plural channel controllers 110 and they form a cluster 180. For example, a cluster 180 can be constructed by pairing two CHNs 110. With the construction of clusters 180, even when trouble occurs in a channel controller 110 belonging to some cluster, another channel controller 110 belonging to the same cluster can take over the processing which has been carried out by the channel controller 110 having trouble (fail-over control). FIG. 12 shows an example in which the cluster 180 is constructed by two CHNs 110.

As described above, the channel controllers 110, the disk controllers 140, the cache memory 130, the shared memory 120 and the connecting portion 150 are constructed as boards which are mountable in respective slots, and each board may be designed to have plural circuit boards. That is, the board may comprise plural circuit boards. When circuit boards are mutually connected to one another to form a unit and these circuit boards can be integrally mounted in a slot of the storage device controller 100, these circuit boards are contained in the concept of a board.

The storage device controller 100 is equipped with fans 170 for radiating heat generated from the channel controllers 110, etc. The fans 170 are equipped at the upper surface portion of the storage device controller 100, and also equipped at the upper side of the slots.

Conventional devices which are manufactured as SAN-adapted products may be used as the storage device controller 100 and the disk driving device 300. Particularly when the connectors of CHFs 110 are designed to be compatible with the connectors of CHAs 110 and CHFs 110 as described above so that they can be mounted in the slots formed in a conventional housing, the conventional device can be more simply used. That is, the storage system 600 of this embodiment can be easily constructed by utilizing existing products.

[Channel Controller]

The storage system 600 according to this embodiment accesses file access requests from the information processing devices 1 to 3 (200) under control of a CHN 110, as described above, and it supplies the services as a NAS to the information processing devices 1 to 3 (200).

FIG. 7 shows the construction of the CHN 110. As shown in FIG. 7, a CHN 110 is constructed as one unified board having a circuit board(s) 118. The CHN 110 is constructed to have one or plural circuit boards 118. On the circuit board 118 there are a processor 1 (119), a processor 2 (second processor) 112, a DMA (data transfer device) 114, a memory 1 (third memory) 117, a memory 2 (second memory) 113, a memory controller 1 (111), a memory controller 2 (111) and a connector 116. The processor 1 (119), the processor 2 (second processor) 112, DMA (data transfer device) 114, the memory controller 1 (111) and the memory controller 2 (111) are connected to one another through a PCI (Peripheral Component Interconnect) bus so that they can communicate with one another. However, all parts are not necessarily required to be connected to one another through the PCI bus, and some or all of the connections may be set to conform with other standards.

The processor 2 (112), the memory 2 (113) and the memory controller 2 (111) provide the communication interface function for communicating with the information processing device 200, and function as a file access processor. In the case of CHN 110, it receives a file access request transmitted from the information processing device 200 according to the TCP/IP protocol, for example, and controls the transmission/reception of data. The connector 116 connected to the memory controller 2 (111) is used to communicate with the information processing device 200.

The processor 2 (112) effects control to make the CHN 110 function as a NAS by executing various programs stored in the memory 2 (113).

Figure 9:
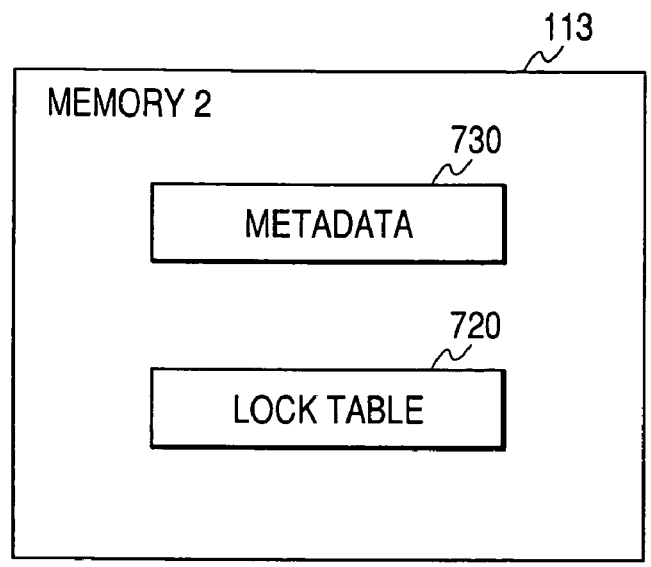
FIG. 9 is a diagram showing meta data, and a lock table according to the embodiment.

Various programs and data are stored in the memory 2 (113). For example, data transmitted/received to/from the information processing device 200 is stored in the memory 2. Furthermore, various kinds of programs, such as meta data 730 and a lock table 720 shown in FIG. 9, an NAS manager 706, etc. are stored. The meta data 730 is information generated in connection with files managed by the file system. The meta data 730 contains information for specifying the storage places of the files, such as the addresses and data size on the LU 310 in which the data of the files is stored. The meta data 730 may contain the capacities, owners, renewal times, etc. of the files. Furthermore, the meta data 730 may be generated not only in connection with the files, but also in connection with the directories. FIG. 13 show an example of the meta data 730. The metal data 730 is also stored on each LU 310 on the disk driving device 300.

The lock table 720 is a table for exclusively controlling the file access from the information processing devices 1 to 3 (200). Through exclusive control, the information processing devices 1 to 3 (200) can jointly own the files. FIG. 14 shows the lock table 720. As shown in FIG. 14, the lock table 720 is classified into a file lock table 721 and an LU lock table 722. The file lock table 721 is a table indicating whether the lock is applied for every file or not. When a file is opened by some information processing device 200, the file concerned is locked. Any access from the other information processing devices 200 to the locked file is prohibited. The LU lock table 722 is a table indicating whether the lock is applied for every LU 310 or not. When access to some LU 310 is made by some information processing device 200, the LU 310 concerned is locked. Any access of the other information processing devices 200 to the locked LU 310 is prohibited.

The storage address (storage position) of the data stored in the memory 2 (113) is managed by the processor (112).

The processor 1 (119), the memory 1 (117), DMA 114 and the memory controller 1 (111) transmit/receive data or commands to/from the disk controllers 140, the cache memory 130, the shared memory 120 and the management terminal 160. The processor 1 (119) instructs DMA 114 to transfer the data stored in the memory 2 (113) to the cache memory 130 and transfer the data stored in the cache memory 130 to the memory 2 (113). That is, the data transfer between the memory 2 (113) and the cache memory 130 is carried out by DMA 114.

The processor 1 (119) outputs to the disk controller 140, through the shared memory 120, the block access request corresponding to the file access request received from the information processing device 200 by the processor 2 (112). The processor 1 (119) manages the storage addresses (storage positions) of data stored in the cache memory 130 and the storage addresses (storage positions) of data stored in the memory 1 (117).

The data transfer carried out between the cache memory 130 and the memory 2 (113) will be described in detail later.

Next, the hardware construction of the CHF 110 and CHA 110 is shown in FIG. 8. As in the case of the CHN 110, each of the CHF 110 and CHA 110 is constructed as one unified board having a circuit board(s) 118. Like CHN 110, each of the CHA 110 and CHF 110 may be constructed to have plural circuit boards. CHF 110 and CHA 110 are designed to be compatible with CHN 110 in size, the position of the connector 116, the pin arrangement of the connector 116, etc.

A processor 1 (119), a protocol chip 115, a DMA 114, a memory 1(117), a memory 2 (113), a memory controller 1 (111), a memory controller 2 (111) and a connector 116 are formed on the circuit board 118 of the CHF 110 and CHA 110. The processor 1 (119), the protocol chip 115, the DMA 114, the memory controller 1 (111) and the memory controller 2 (111) are connected to one another through a PCI (peripheral Component Interconnect) bus so that communications can be carried out there among. However, all of the parts are not necessarily required to be connected to one another through the PCI bus, and some or all of the connections may be designed to conform with another standard.

The protocol chip 115, the memory 2 (113) and the memory controller 2 (111) provide the communication interface function for communicating with the information processing device 200. In the case of CHF 110, it receives the block access request transmitted from the information processing device 200 according to the fibre channel protocol. In the case of CHA 110, it receives the block access request transmitted from the information processing device 200 according to a protocol such as FICON (registered trademark), ESCON (registered trademark), ACONARC (registered trademark), FIBARC (registered trademark) or the like. The connector 116 connected to the memory controller 2 (111) is a connector for connecting with the information processing device 200. In the case of CHF 110, it is a connector connectable to the SAN 500, and it is adapted to fibre channels. In the case of CHA 110, it is a connector connectable to the information processing device 5, and it is adapted to FICON (registered trademark), ESCON (registered trademark), ACONARC (registered trademark), FIBARC (registered trademark), etc.

In the memory 2, there stored data transmitted/received to/from the information processing device 200, for example. In the case of the CHF 110 or CHA 110, the storage addresses (storage positions) of data stored in the memory 2 (113) are managed by the processor 1 (119).

The processor 1 (119), the memory 1 (117), the DMA 114 and the memory controller (111) transmit/receive data and commands to/from the disk controllers 140, the cache memory 130, the shared memory 120 and the management terminal 160. The processor 1 (119) instructs the DMA 114 to transmit the data stored in the cache memory 130 to the memory 2(113). That is, the data transfer between the memory 2 (113) and the cache memory 130 is carried out by DMA 114.

The processor 1 (119) outputs the block access request received from the information processing device 200 through the shared memory 120 to the disk controller 140. Furthermore, the processor 1 (119) manages the storage addresses (storage positions) of the data stored in the cache memory 130 and the storage addresses (storage positions) of the data stored in the memory 1 (117). That is, in the case of the CHA 110 or CHF 110, the data transfer between the memory 2 (113) and the cache memory 130 is carried out on the basis of the storage positions of the data of the cache memory 130 and the memory 2 (113) managed by the processor 1 (119).

[Disk Controller]

Figure 10:
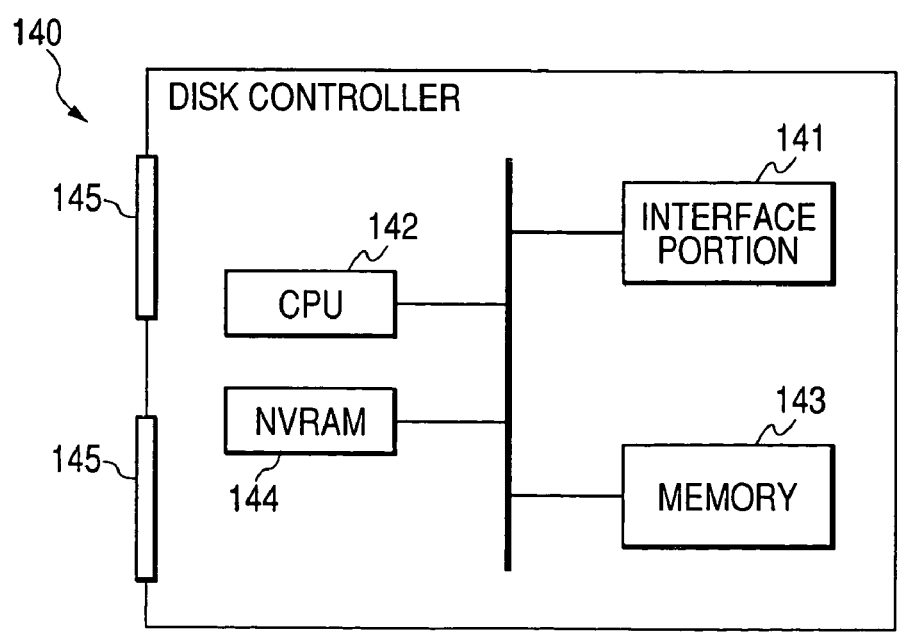
FIG. 10 is a block diagram showing a disk controller according to the embodiment.

The construction of the disk controller 140 is shown in FIG. 10. The disk controller 140 is equipped with an interface portion 141, a memory 143, a CPU 142, a NVRAN (nonvolatile random-access memory) 144, and a connector 145, and these parts are integrally formed as a unit.

The interface portion 141 is equipped with a communication interface for communicating with the channel controllers 110, etc. through the connecting portion 150, and a communication interface for communicating with the disk driving device 300.

The CPU 142 controls the overall disk controller 140, and it also communicates with the channel controller 110, the disk driving device 300 and the management terminal 160. The various programs stored in the memory 143 and NVRAM 144 are executed by the CPU 142 to implement the function of the disk controller 140 according to this embodiment. The function implemented by the disk controller 140 includes the control of the disk driving device 300, the RAID control, the copy management, backup control and remote copy control, etc. of data stored in the disk driving device 300.

The NVRAN 144 is a nonvolatile memory for storing programs used to control the CPU 142. The contents of the programs stored in the NVRAN 144 can be written/rewritten on the basis of an instruction from the NAS manager 706.

Furthermore, the disk controller 140 is equipped with a connector 145. The connector 145 is engaged with the connector at the storage device controller 100 side, whereby the disk controller 140 is electrically connected to the storage device controller 100.

[Software Configuration]

Figure 11:
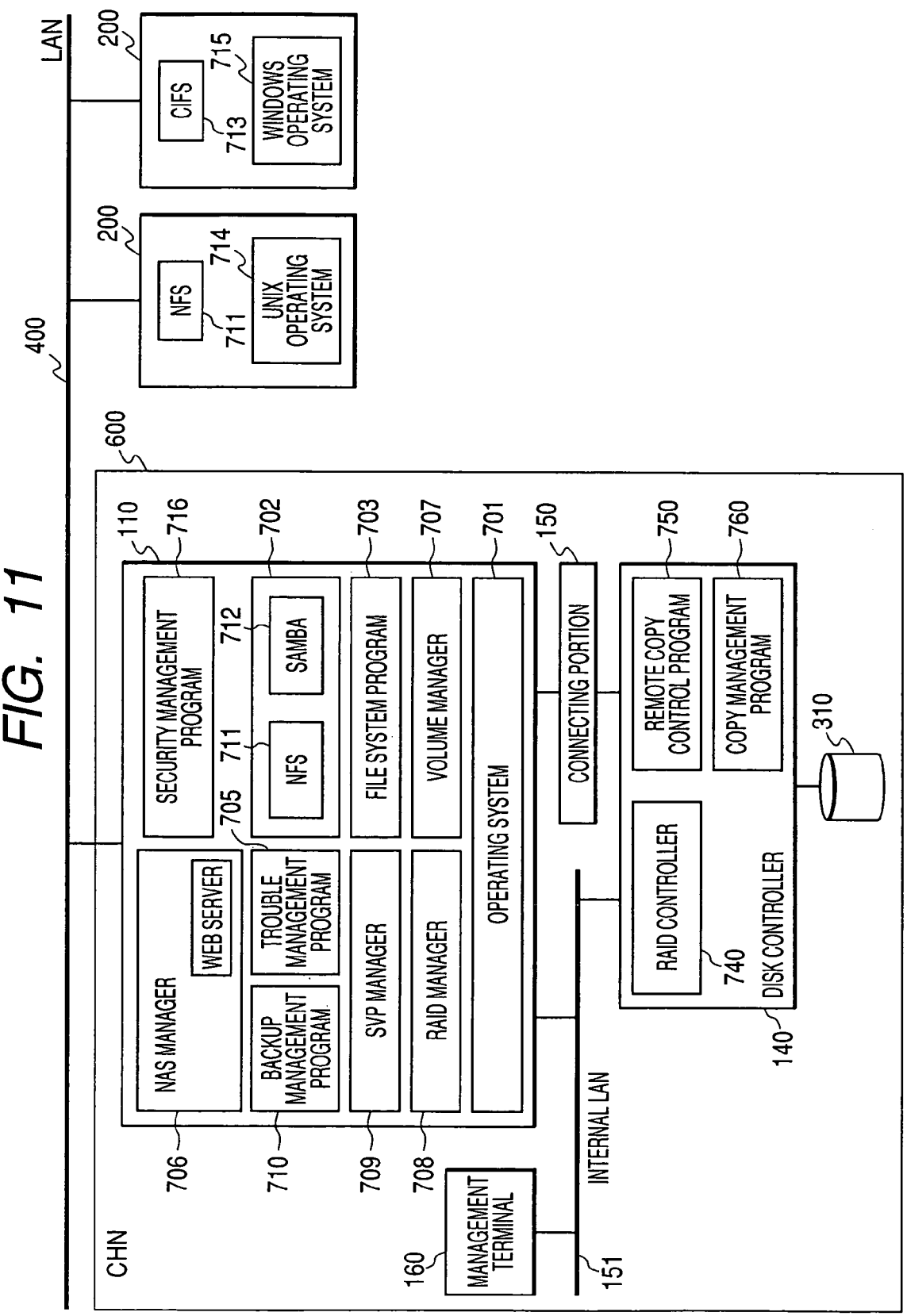
FIG. 11 is a diagram showing the software construction of the storage system according to the embodiment.

The software configuration of the storage system 600 according to this embodiment is shown in FIG. 11.

Software such as a RAID manager 708, a volume manager 707, an SVP (Service Processor) manager 709, a file system program 703, a network control program 702, a backup management program 710, a trouble management program 705, an NAS manager 706, etc. operate on an operating system 701.

The RAID manager 708 operating on the operating system 701 provides the setting function of parameters for the RAID controller 740 which is carried out in the disk controller 140, and the function of controlling the RAID controller 740. The RAID manager 708 accepts the operating system 701, and the other applications operating on the operating system 701, or parameters and control instruction information from the management terminal 160 to set the accepted parameters in the RAID controller 740 and transmit the control command corresponding to the RAID controller instruction information.

The volume manager 707 supplies the file system block 703 with a virtual logic volume achieved by further virtualizing the LU 310 supplied from the RAID controller 740. One virtual logic volume comprises one or more logic volumes.

The main function of the file system program 703 is to manage the association between a file name indicated in a file access request received by the network control program 702 and the address on the virtual logic volume at which the file name concerned is stored. For example, the file system program 703 specifies the address on the virtual logic volume which corresponds to the file name indicated in the file access request.

The network control program 702 comprises two file system protocols, including NFS (Network File System) 711 and samba 712. NFS 711 accepts a file access request from a UNIX (registered trademark) type information processing device 200 in which NFS 711 operates. Samba 712 accepts a file access request from a Windows (registered trademark) type information processing device 200 in which CIFS (Common Interface File System) 713 operates.

The NAS manager 706 is a program to check and set the operating status of the storage system 600. The NAS manager 706 also functions as a web server, and it provides the information processing device 200 with a Web page for performing the setting and control of the storage system 600 from the information processing device 200. The NAS manager 706 receives the data relevant to the setting and control which are transmitted from the information processing device 200 in response to the operation of the Web page, and executes setting and control corresponding to the data. Accordingly, various setting and control of the storage system 600 can be performed from the information processing devices 1 to 3 (200).

The backup management program 710 is a program for backing up the data stored in the disk driving device 300 via LAN 400 or SAN 500.

The trouble management program 705 is a program for performing the fail-over control described above between the channel controllers 110 constituting the cluster 180.

The SVP manager 709 supplies the management terminal 160 with various services in response to a request from the management terminal 160. For example, it supplies the management terminal 160 with various setting contents concerning the storage system 600, such as the setting content of LU 310, the setting content of RAID, etc., and reflects the various kinds of settings relevant to the storage system 600 which are input from the management terminal 160.

The security management program 716 implements a computer virus detecting function, a function for monitoring of invasion of a computer virus, a management function for renewal of a computer virus detecting program, a function of excluding an infected computer virus, a fire wall function, etc.

[Data Transfer by DMA]

Next, data transfer between the memory 2 (113) and the cache memory 130 in CHN 110 according to this embodiment will be described.

Figure 16:
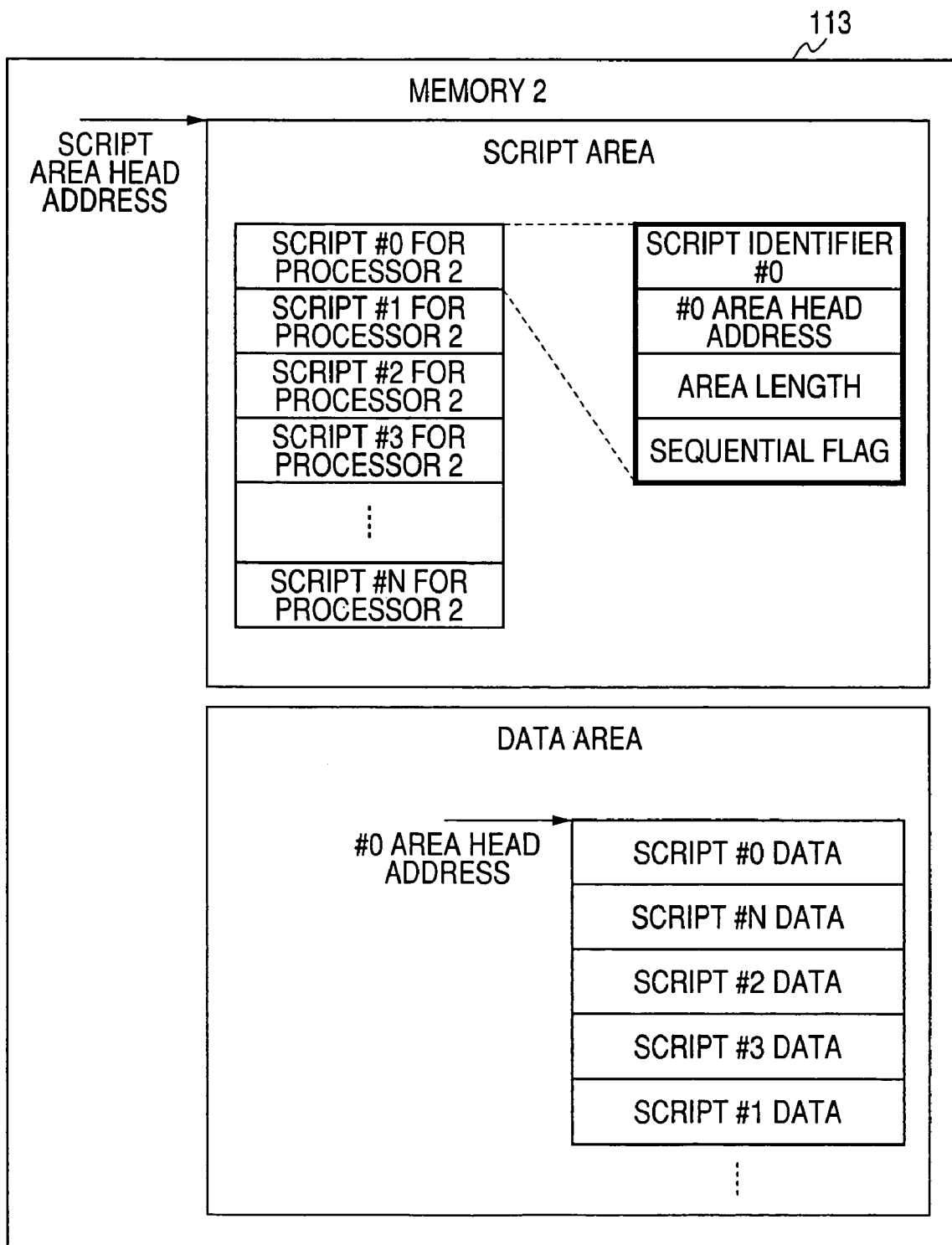
FIG. 16 is a diagram showing a memory 2 according to the embodiment.
Figure 17:
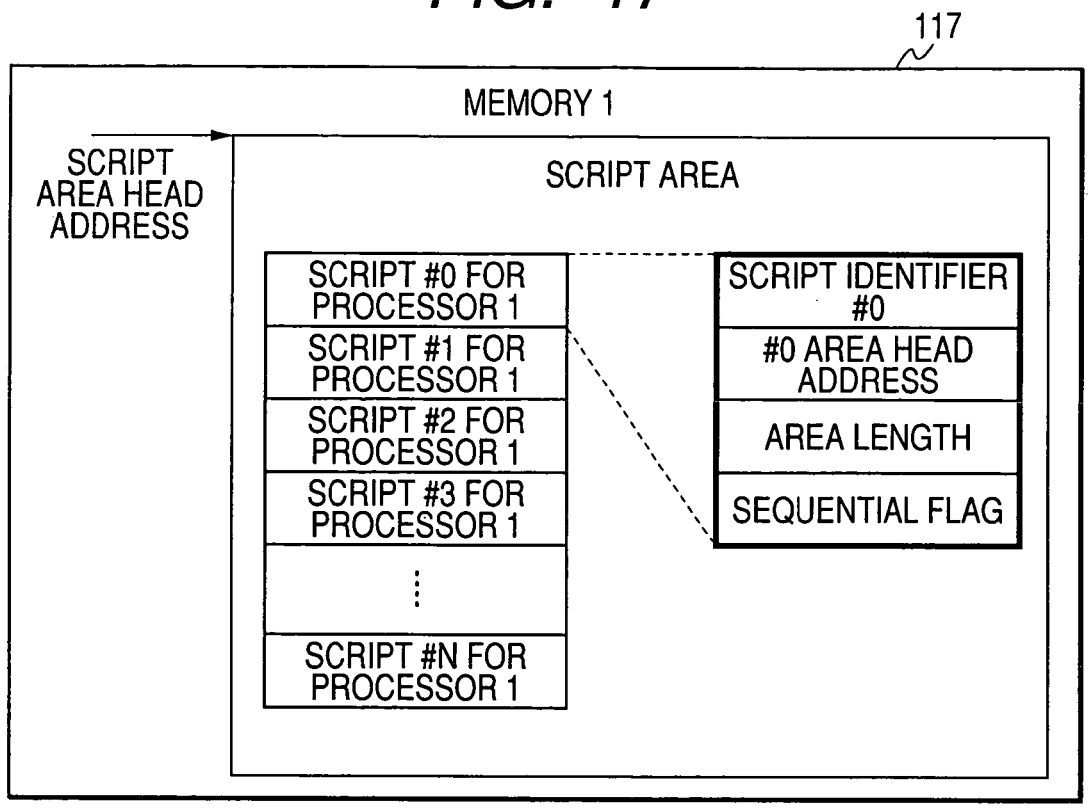
FIG. 17 is a diagram showing a memory 1 according to the embodiment.

As shown in FIG. 16, the memory 2 has a data area and a script area. Data to be transferred to the cache memory 130 or data transferred from the cache, memory 130 are stored in the data area. The storage position of each data stored in the data area, the size (area length) of the storage area of each data, etc. are stored in the script area of the memory 2 (113) as a script for the processor 2 (second data transfer information) in association with each data. The script for the processor 2 has respective columns for "script identifier", "area head address", "area length" and "sequential Flag". The "script identifier" indicates an identification number allocated for every script for the processor 2. The "area head address" indicates the storage address of data stored in the data area. The "area length" indicates the size of the storage area of the data. The "sequential Flag" is a flag set when plural data stored in the data area are required to be transferred as a lump. These scripts for the processor 2 stored in the memory 2 (113) are set by the processor 2 (112), and written in the script area of the memory 2 (113).

Figure 18:
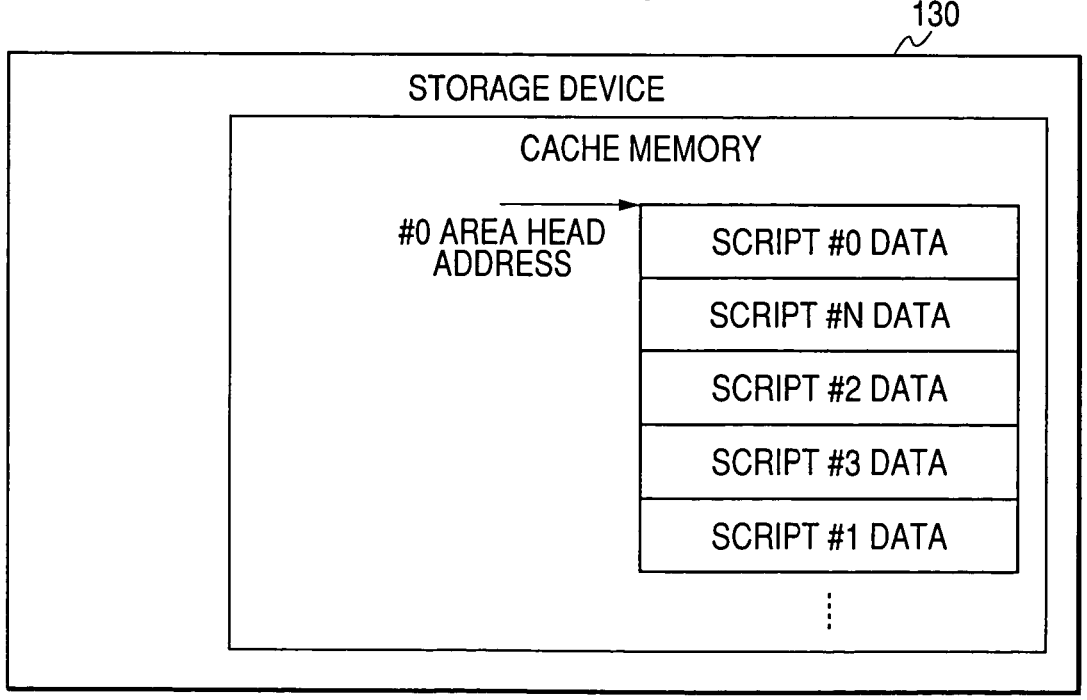
FIG. 18 is a diagram showing a cache memory according to the embodiment.

Furthermore, data to be transferred to the memory 2 (113) or data transferred from the memory 2 (113) are stored in the data area of the cache memory 130 as shown in FIG. 18. The storage position of each data stored in the data area, the size (area length) of the storage area of each data, etc. are stored in the script area of the memory 1 (117) as a script for the processor 1 (first data transfer information) in association with each data. The script for the processor 1 is equipped with respective columns for "script identifier", "area head address", "area length" and "sequential Flag". The meaning of each column is the same as the script for the processor, 2 in the memory 2 (113). The scripts for the processor 1 stored in the memory 1 (117) are set by the processor 1 (119), and written into the scrip area of the memory 1 (117).

Figure 15:
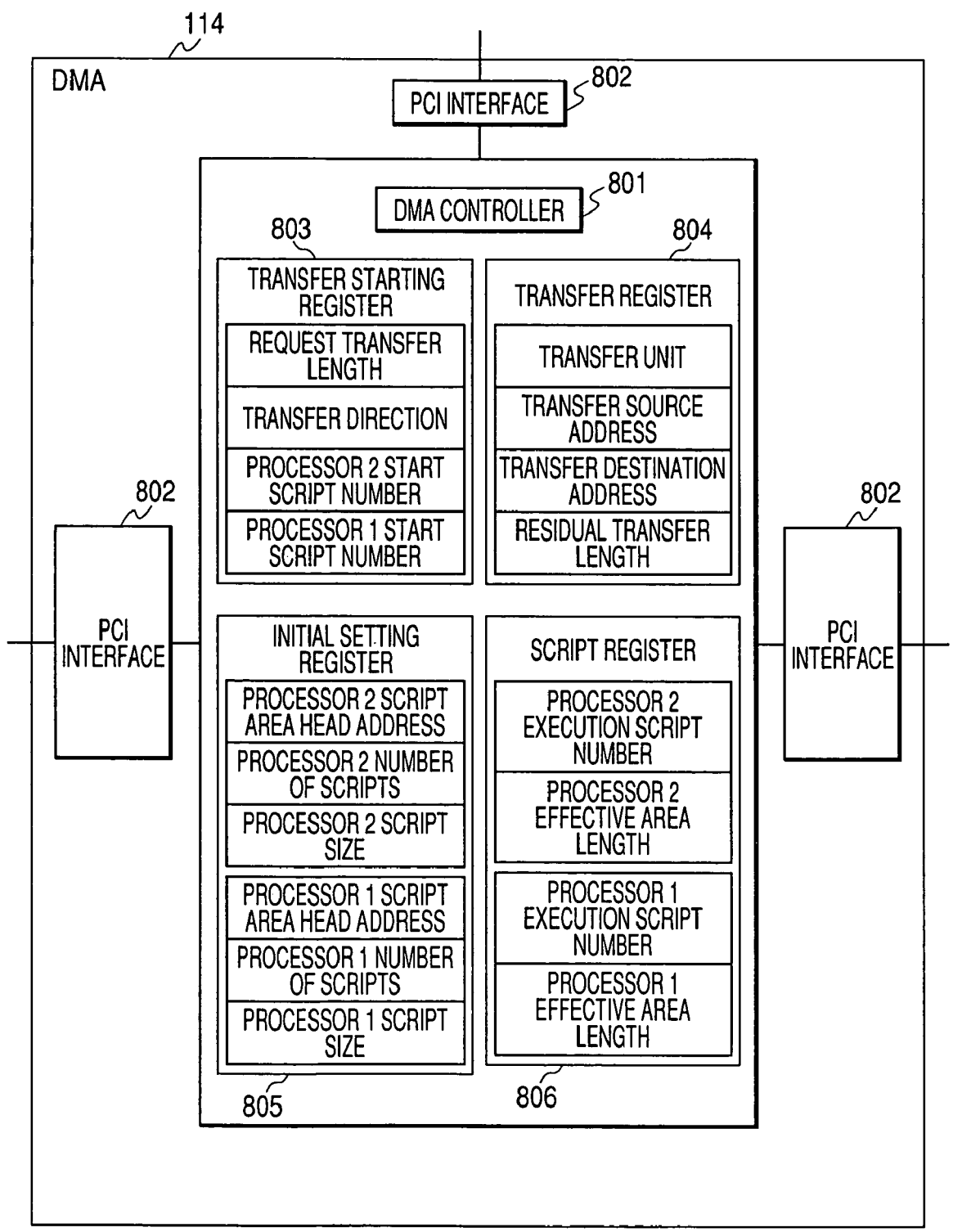
FIG. 15 is a block diagram showing the construction of the DMA unit according to the embodiment.

Next, the construction of the DMA 114 for controlling the data transfer between the memory 1 (113) and the cache memory 130 on the basis of each script will be described with reference to FIG. 15.

The DMA 114 has a DMA controller 801, a PCI interface 802, a transfer start register 803, a transfer register 804, an initializing register 805 and a script register 806.

The DMA controller 801 controls the whole DMA 114. For example, it reads out the scripts described above, controls the data transfer, outputs an end status (the transfer result of data), etc. The DMA controller 801 may be constructed by only hardware or by a combination of hardware and software.

The PCI interface 802 is a communication interface for communicating with the memory controller 111, etc. through the PCI bus. However, when the connection between the DMA 114 and the memory controllers 111, etc. is conformed with standards other than PCI, the PCI interface 802 may be a communication interface conformed with the respective other standards.

The transfer start register 803 is equipped with each of the registers for "request transfer length", "transfer direction", "processor 2 starting script number" and "processor 1 starting script number".

The "request transfer length" register describes the total data length of data transferred between the memory 2 (113) and the cache memory 130. The request transfer length is determined on the basis of the file access request received from the information processing device 200. For example, when the processor 2 (112) receives a writing request of data of 8 kilo bytes (kB) from the information processing device 200, 8 kB is stored in the "request transfer length" register. As will be described in detail later, the request transfer length is temporarily transmitted from the processor 2 (112) for receiving the file access request to the processor 1 (119), and then it is written into the transfer start register 803 of the DMA 114 by the processor 1 (119) when the processor 1 (119) starts data transfer to the DMA 114.

The "transfer direction" register describes whether the data transfer is directed from the memory 2 (113) to the cache memory 130 or from the cache memory 130 to the memory 2 (113). The transfer direction is determined on the basis of the file access request received from the information processing device 200 by the processor 2 (112). For example, when the processor 2 receives a data writing request from the information processing device 200, the transfer direction is the transfer from the memory 2 (113) to the cache memory 130. When the processor 2 (112) receives a data reading request from the information processing device 200, the transfer direction is from the cache memory 130 to the memory 2 (113). As will be described in detail later, as in the case of the request transfer length, the transfer direction is temporarily transmitted from the processor 2 (112) for receiving the file access request to the processor 1 (119), and then it is written into the transfer start register 803 of DMA 114 by the processor 1 (119) when the processor 1 (119) starts the data transfer to DMA 114.

The identifier of the script for the processor 2 stored in the memory 2 (113) is described in the "processor 2 starting script number". The DMA controller 801 reads out from the memory 2 (113) the script for the processor 2 stored in the "processor 2 starting script number" register, and starts the data transfer. The processor 2 starting script number is temporarily transmitted from the processor 2 (112) for controlling the memory 2 (113) to the processor 1 (119), and then it is written into the transfer start register 803 of the DMA 114 by the processor 1 (119) when the processor 1 (119) starts the data transfer to the DMA 114. Alternatively, when the sequential Flag is set in the script for the processor 2, the processor 2 starting script number is renewed by the DMA controller 801.

The identifier of the script for the processor 1 stored in the memory 1 (117) is described in the "processor 1 starting script number". The DMA controller 801 reads out from the memory 1 (117) the script for the processor 1 stored in the "processor 1 starting script number", and starts the data transfer. The processor 1 starting script number is written into the transfer start register 803 of DMA 114 by the processor 1 (119) when the processor 1 (112) for controlling the cache memory 130 starts the data transfer to DMA 114. Alternatively, when the sequential Flag is set in the script for the processor 1, the processor 1 starting script number is renewed by the DMA controller 801.

The transfer register 804 is equipped with respective registers for "transfer unit", "transfer source address", "transfer destination address" and "residual transfer length".

The "transfer unit" register describes the data transfer length in one data transfer. The data transfer length in one data transfer is calculated by the DMA controller 801. As will be described in detail later, the transfer unit is determined by the DMA controller 801 according the flow shown in FIG. 22.

The "transfer source address" register indicates the storage position of data before transfer. The transfer source address is determined on the basis of the description of the transfer direction and the script for the processor 1 or the script for the processor 2. During the data transfer, the value of the "transfer source address" register is properly incremented or decremented by the DMA controller 801 with the progress of the data transfer.

The "transfer destination address" register indicates the storage position of data after transfer. The transfer destination address is determined on the basis of the description of the transfer direction and the script for the processor 1 or the script for the processor 2. During the data transfer, the value of the "transfer destination address" register is properly incremented or decremented by the DMA controller 801 with the progress of the data transfer.

The "residual transfer length" register indicates the value achieved by subtracting the transferred data transfer length from the request transfer length. The residual transfer length is properly renewed by the DMA controller 801 with the progress of the data transfer.

The initializing register 805 has respective registers for "script area head address for the processor 2", "script number for the processor 2", "script size for the processor 2", "script area head address for the processor 1", "script number for the processor 1" and "script size for the processor 1". These values of the initializing register 805 may be read out from the NVRAM equipped to CHN 110 by the DMA controller 801 when the channel controllers 110 are powered on and reset.

The "script area head address for the processor 2" indicates the head address of the script area in the memory 2 (113). That is, it indicates the address at which the script for the processor 2 is stored.

The "script number for the processor 2" indicates the number of scripts for the processor 2. It is equal to N+1 in the case of FIG. 16.

The "script size for the processor 2" indicates the size of the script for the processor 2. When the size of the script for the processor 2 is fixed as described above, the storage address of the script for target processor 2 based on the head address of the script area can be calculated by specifying the identifier of the script for the processor 2.

Each of the "script area head address for the processor 1" register, the "script number for the processor 1" register and the "script size for the processor 1" register is the same as the script for the processor 2.

The script register 806 has respective registers for "execution script number for the processor 2", "effective area length for the processor 2", "execution script number for the processor 1" and "effective area length for the processor 1".

The "execution script number for the processor 2" register indicates the identifier of the script for the processor being executed at present. The execution script number for the processor 2 is set by the DMA controller 801.

The "effective area length for the processor 2" register indicates a value achieved by subtracting the transferred data size from the area length described in the column of the area length of the script for the processor 2, and it is properly decremented by the DMA controller 801 with the progress of the data transfer.

The "execution script number for the processor 1" and the "effective area length for the processor 1" are the same as the "execution script number for the processor 2" register and the "effective area length for the processor 2" register.

[Flow of Data Transfer].

Next, the processing flow of the data transfer carried out between the memory 2 (113) and the cache memory 130 will be described with reference to the flowchart of FIGS. 19 to 23.

First, the processor 2 (112) secures the data area (S1000). When the file access request transmitted from the information processing device 200 is a writing request, the securement of the data area means that writing data is stored in the memory 2 (113). When the file access request transmitted from the information processing device 200 is a reading request, the securement means that a storage area for storing read-out data is secured in the memory 2 (113). Here, the data area to be secured is not limited to one. This is because there may be a case where data relevant to one file access request must be divided into plural parts and then stored in the memory 2 (113) under some distribution situation of the data-storable area in the memory 2 (113).

Subsequently, the processor 2 (112) creates the script for the processor 2 (S1001). The head address, the area length, etc. of the data area secured in S1000 are stored as the script for the processor 2 in the script area of the memory 2 (113). When plural data areas are secured in S1000, the script for the processor 2 is created for every data area. At this time, sequential Flags are set to manage, the respective scripts for the processor 2 in a lump.

Accordingly, the scripts for the processor 2 containing information indicating the storage positions of data in the memory 2 (113) are written in the memory 2 (113).

The processor 2 (112) transmits a data transfer request command to the processor 1 (119) (S1002). The data transfer request command contains the identifier of the script for the processor 2 created in S101, the request transfer length and the transfer direction. The request transfer length is the size of the data to be read/written, which is described in the file access request.

The processor 1 (119) analyzes the data transfer request command transmitted from the processor 2 (112) (S1003) to recognize the number of the script for the processor 2, the request transfer length and the transfer direction.

Subsequently, the processor 1 (119) secures in the cache memory 130 the data area having the size indicated by the request transfer length (S1004). In this case, there is also a case where plural data areas are secured under some distribution situation of the storable memory space in the cache memory 130.

The processor 1 (119) creates the script for the processor 1 in connection with each data area secured in the cache memory 130 (S1005). When plural data areas are secured, sequential Flags are set to manage the respective scripts for the processor 1 in a lump.

Accordingly, the scripts for the processor 1 containing the information indicating the storage positions of the data in the cache memory 130 are written in the memory 1 (117).

Thereafter, the processor 1 (119) transmits the transfer start information containing the request transfer length, the transfer direction, the identifier of the script for the processor 2 and the identifier of the script for the processor 1 to the DMA 114, and it writes this data into the transfer start register 803 of the DMA 114, whereby the processor 1 (119) starts DMA 114 (S1006).

At this time, the DMA 114 starts the DMA transfer processing (S1007). The DMA transfer processing will be described with reference to FIGS. 20 to 23.

Figure 21:
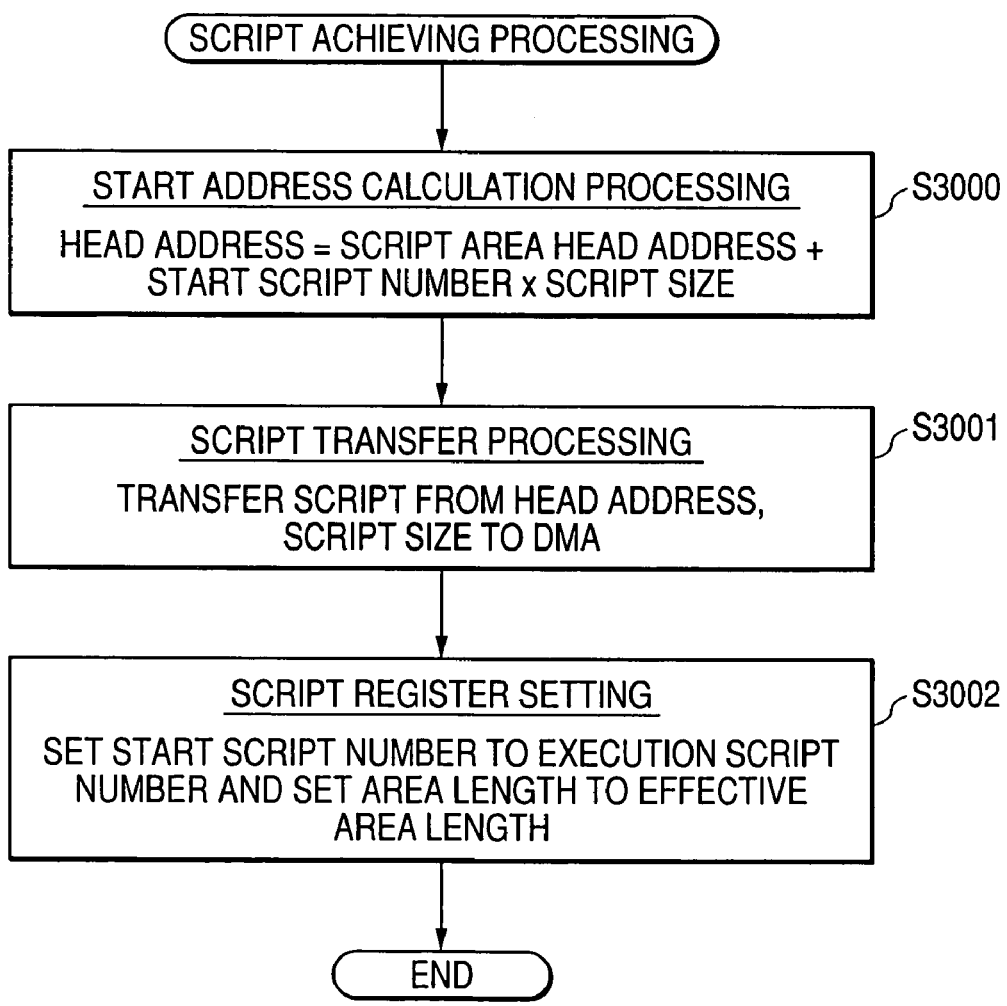
FIG. 21 is a flowchart showing the flow of the script achieving processing according to the embodiment.

First, the DMA controller 801 achieves the script for the processor 1 and the script for the processor 2 on the basis of the identifiers of the script for the processor 1 and the script for the processor 2 as described in the transfer start information (S2000). The scripts are achieved as shown in FIG. 21.

The DMA controller 801 calculates the storage address of the script for the processor 1 in the memory 1 (117) from the identifier of the script for the processor 1 described in the transfer start information transmitted from the processor 1 (119) and the size of the script for the processor 1 stored in the initializing register 805 on the basis of the transfer start information (S3000). When the storage address of the script for the processor 1 can be calculated, the script for the processor 1 is subsequently read out from the storage address concerned in the memory 1 (117) (S3001). Here, the DMA controller 801 writes the area head address described in the script for the processor 1 into the transfer destination address or transfer source address column of the transfer register 804 in accordance with the transfer direction. The script identifier described in the script for the processor 1 and the area length described in the area length column are written in the execution script number column for the processor 1 of the script register 806 and the effective area length column for the processor 1, respectively (S3002).

Likewise, the DMA controller 801 calculates the storage address of the script for the processor 2 in the memory 2 (113) from the identifier of the script for the processor 2 described in the transfer start information transmitted from the processor 1 (119) and the size of the script for the processor 2 stored in the initializing register 805 on the basis of the transfer start information (S3000). When the storage address of the script for the processor 2 can be calculated, the script for the processor 2 is subsequently read out from the storage address concerned in the memory 2 (113) (S30001). Here, the DMA controller 801 writes the area head address described in the script for the processor 2 in the transfer source address column or transfer destination address column of the transfer register 804 in accordance with the transfer direction. The script identifier described in the script for the processor 2 of the script register 806 and the area length described in the area length column are written in the execution script number column for the processor 2 of the script register 806 and the effective area length column for the processor 2, respectively (S3002).

Subsequently, the DMA controller 801 determines the transfer unit (S2001). The transfer unit is determined according to the flow shown in FIG. 22.

First, the DMA controller 801 writes the residual transfer length into the residual transfer column of the transfer register 804. The request transfer length is written at the start time of the transfer (S4000).

The minimum length of the effective area length of the processor 1, the effective area length of the processor 2 and the residual transfer length is set as the transfer unit (S4001 to S4007).

The DMA controller 801 transfers to the transfer destination address the data stored at the transfer source address stored in the transfer register 804 to the transfer destination address whose data amount corresponds to only the data size of the transfer unit (S2002).

During execution of the transfer, the transfer source address, the transfer destination address and the residual transfer length of the transfer register 804 are successively renewed, and each of the effective area length for the processor 2 and the effective area length for the processor 1 in the script register 806 are successively decremented every data size of transferred data.

When any value of the effective area length for the processor 2, the effective area for the processor 1 and the residual transfer length in the script register 806 is equal to zero, the DMA controller 801 carries out transfer end judgment processing (S2003).

Figure 23:
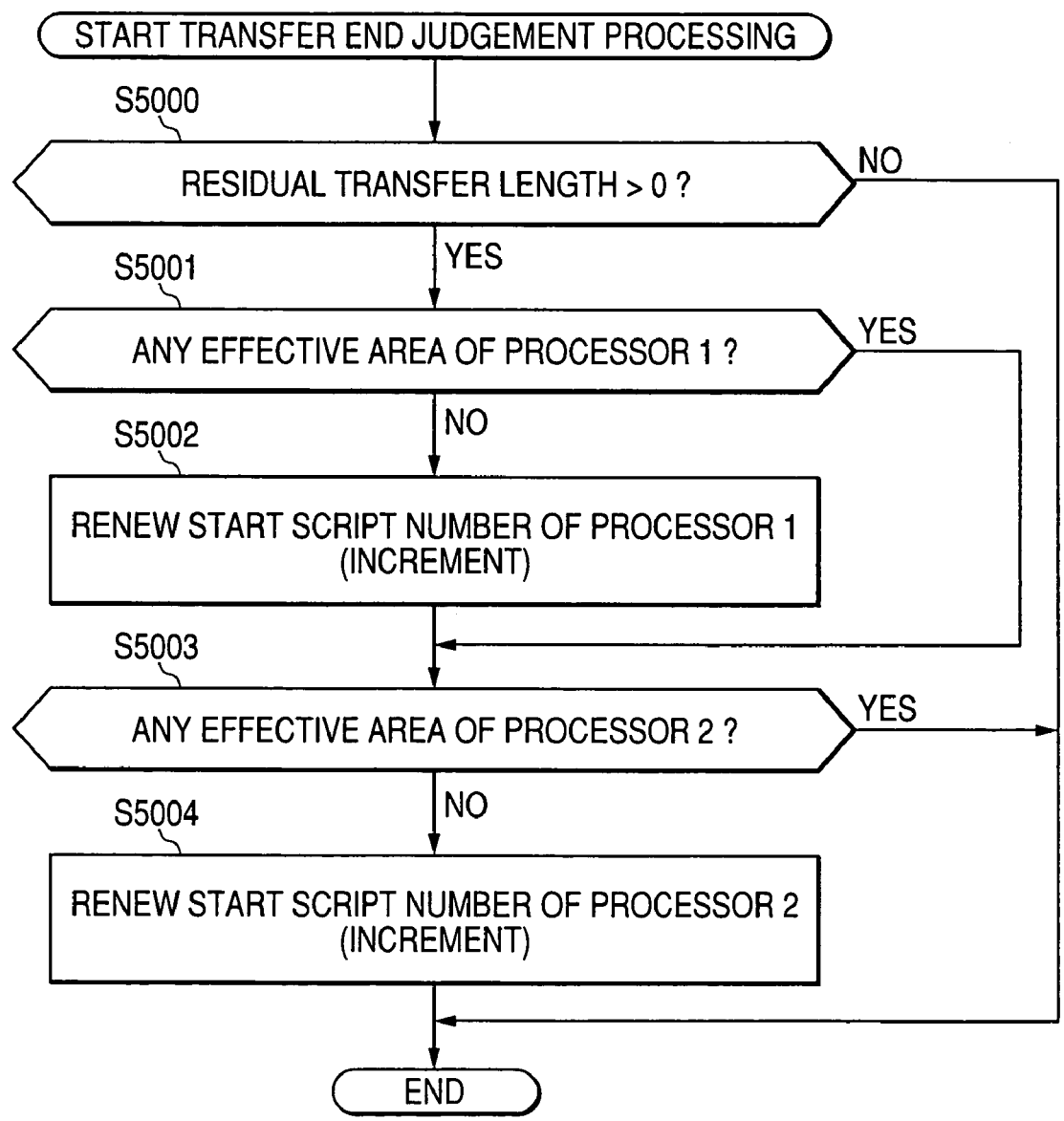
FIG. 23 is a flowchart showing the flow of the transfer end judgement processing according to the embodiment.

The transfer end judgment processing is carried out according to the flow shown in FIG. 23.

First, the DMA controller 801 checks the residual transfer length of the transfer register 804 (S5000). When the residual transfer length is equal to zero, transfer of all the data of the request transfer length has been completed, and thus the processing goes to "No" to finish the processing.

On the other hand, when the residual transfer length is not equal to zero, at least one of the effective area length for the processor 1 and the effective area length for the processor 2 is equal to zero. In this case, the script whose effective area length is equal to zero contains a script to be next executed while the later script to be next executed is linked to the former script with a sequential Flag. Through the processing of S5001 to S5004, it is determined whether the script in which the script to be next executed exists is a script for the processor 1 or a script for the processor 2.

First, it is checked in S5001 whether the effective length for the processor 1 of the script register 806 is equal to zero or not. If it is equal to zero, the processing goes to "Yes", and the start script number for the processor 1 is renewed in S5002. If it is not equal to zero, the processing goes to "No".

Subsequently, it is checked whether the effective area length for the processor 2 is equal to zero or not (S5003). If it is equal to zero, the processing goes to "Yes", and the start script number for the processor 2 is renewed in S5004. If it is not equal to zero, the processing goes to "No".

Subsequently, the DMA controller 801 executes the processing of S2000 again. At this time, the DMA controller 801 reads out the start script number for the processor 1 of the transfer starting register 803 which is renewed in S5002 or S5004, or the script indicated by the start script for the processor 2. The DMA controller 801 carries out the DMA transfer according to the script which is newly read out.

Finally, when the residual transfer length of the transfer register 804 in the transfer end judgment processing in S2003 is equal to zero, the DMA controller 801 finishes the transfer processing. The DMA controller 801 writes into the memory 1 (117) an end status in which the result of the transfer processing is described (S1008), and it transmits an end notification to the processor 1 (119) (S1009). The end notification may be transmitted on the basis of an interruption signal.

The processor 1 (119) reads out the end status from the memory 1 (117), and it executes the processing corresponding to the content thereof (S1010). The processor 1 (119) transmits the end notification to the processor 2 (112).

When the file access request is a data read-out request, the processor 2 (112) can read out the read-out data transmitted to the data area of the memory 2 (113) and transmit the data to the information processing device 200. When the file access request is a data writing request, the storage area of the memory 2 (113) in which the writing data are stored may be opened and used for other processing.

As described above, in the storage device controlling device 100 according to this embodiment, the information such as the data storage position, etc. of the cache memory 130 and the information such as the data storage position, etc. of in the memory 2 (113) are written in the memory 1 (117) by the processor 1 (119). DMA 114 reads out this information from the memory 1 (117) and carries out the data transfer. Accordingly, the idling time of the processor 1 (119) can be reduced, and the processor 1 (119) can be efficiently executed, so that the speed of the data reading/writing operating in response to the file access request can be increased.

In the storage device controlling device 100 according to this embodiment, the script for the processor 2 is stored in the memory 2 (113). The processor 2 (112) transmits, not the script for the processor 2, but the information indicating the storage position of the script for the processor 2 to the processor 1 (119). With this operation, the amount of data transmitted from the inter-processor communication can be reduced, and the communication, time can be also reduced. Therefore, the DMA starting processing time can be shortened, and the speed of the data reading/writing operation carried out in response to the file access request can be increased.

Furthermore, according to the storage device controlling device 100 of this embodiment, even when the data size of the transfer source and the data size of the transfer destination are different from each other, the data transfer can be controlled by DMA 114 without carrying out any control by the processor 1 (119) or the processor 2 (112). Accordingly, the processing loads of the processor 1 (119) and the processor 2 (113) can be reduced, and the speed of the data reading/writing operation carried out in response to the file access request from the information processing device, 200 can be increased.

In the storage device controlling device 100 according to this embodiment, the end status is not stored in the register of the DMA 114, but it is registered into the memory (117). The processor 1 (119) reads out the end status from the memory 1 (117), so that the reading time of the end status by the processor 1 (119) can be shortened. The idle time of the processor 1 (119) can be reduced. Accordingly, the speed of the data reading/writing operation carried out in response to the file access request from the information processing device 200 can be increased.

According to the storage device controlling device 100 of this embodiment, the speed of the data reading/writing operation carried out in response to the file access request from the information processing device 200 can be increased, so that the speed of the data transmission/reception to/from the storage system 610 set up at the secondary site and the speed of the data transmission/reception to/from the backup devices 900, 910 can be increased. The processing performance of the overall information processing system can be greatly enhanced irrespective of the scale of the information processing system using the storage system 600.

In S1002, the data transfer request command transmitted from the processor 2 (112) to the processor 1 (119) may be set not to contain the identifier of the script for the processor 2. In this case, the processor 2 (112) may be set so that the identifier of the script for the processor 2 is stored at a predetermined storage portion in the memory 2 (113), and the DMA 114 reads out the identifier of the script for the processor 2 from the storage position concerned before the DMA transfer processing of S1007 is started.

In S1006, the transfer starting information transmitted from the processor 1 (119) to DMA 114 may be set not to contain the identifiers of the scripts for the processor 1 and for the processor 2. In this case, the processor 1 (112) may be set so that the identifier of the script for the processor 1 and the identifier of the script for the processor 2 are stored at predetermined storage positions in the memory 1 (117), and the DMA 114 can read out the identifier of the script for the processor 1 and the identifier of the script for the processor 2 can be read out from the storage positions concerned before the DMA transfer processing of S1007 is started.

[Specific Example of DMA Transfer]

Figure 24:
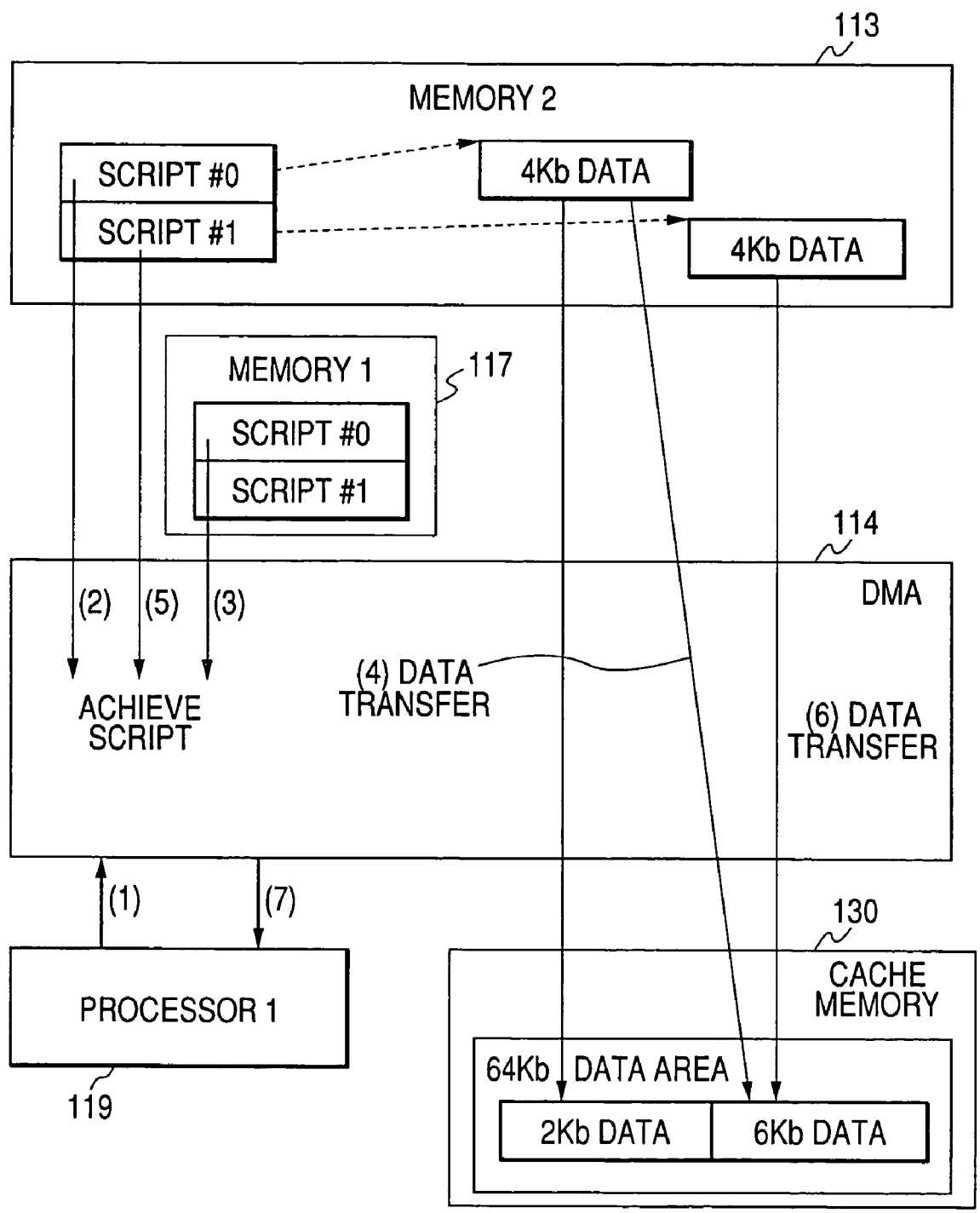
FIG. 24 is a diagram showing a specific example of the DMA transfer according to the embodiment.

Next, the processing flow of the data transfer carried out between the memory 2 (113) and the cache memory 130 will be described with reference to FIG. 24. In the example shown in FIG. 24, two 4 kB data stored in the memory 2 (113) are transferred as 2 kB data and 6 kB data to the 64 kB data area of the cache memory 130.

Figure 19:
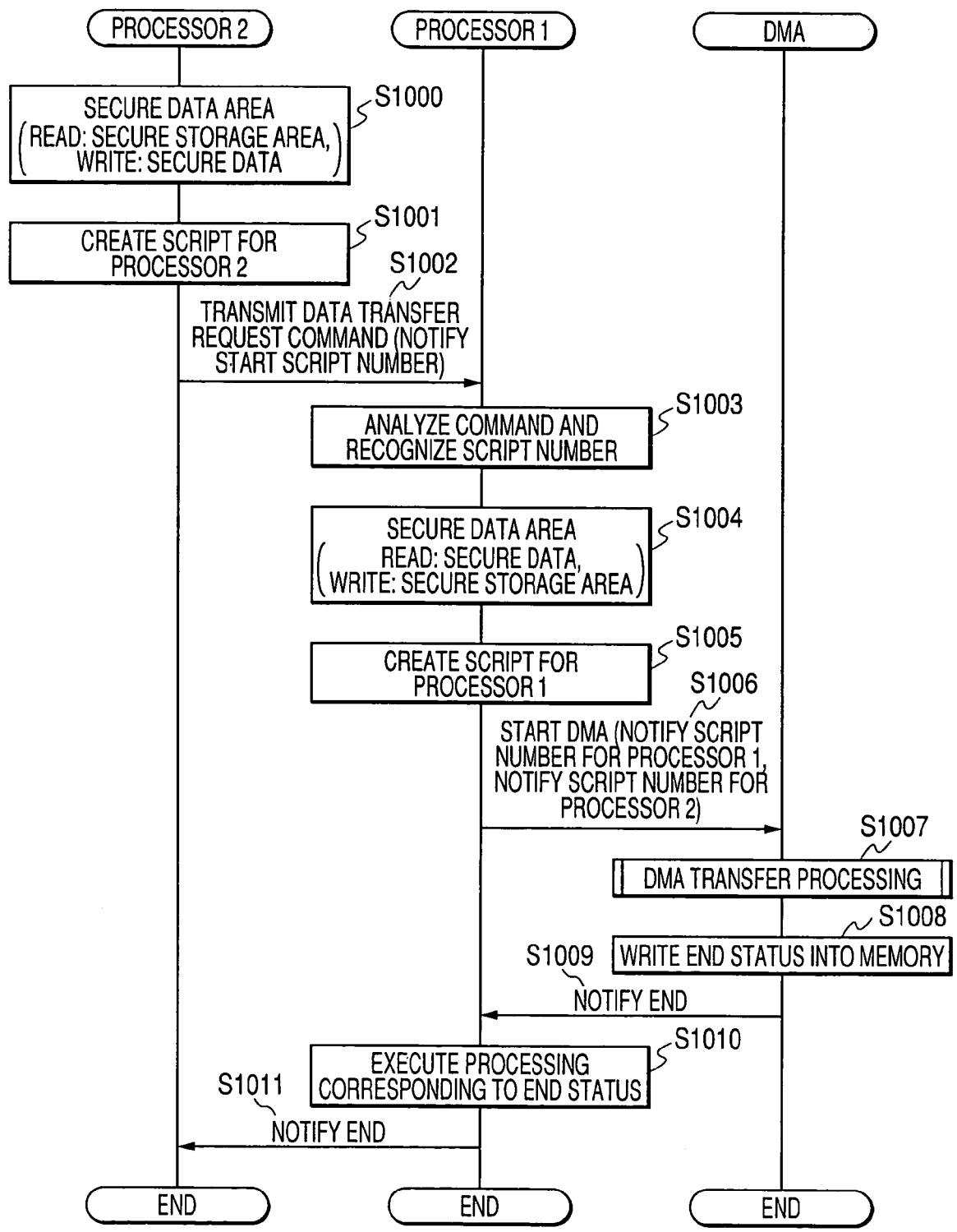
FIG. 19 is a flowchart showing the flow of the DMA transfer processing according to the embodiment.
Figure 20:
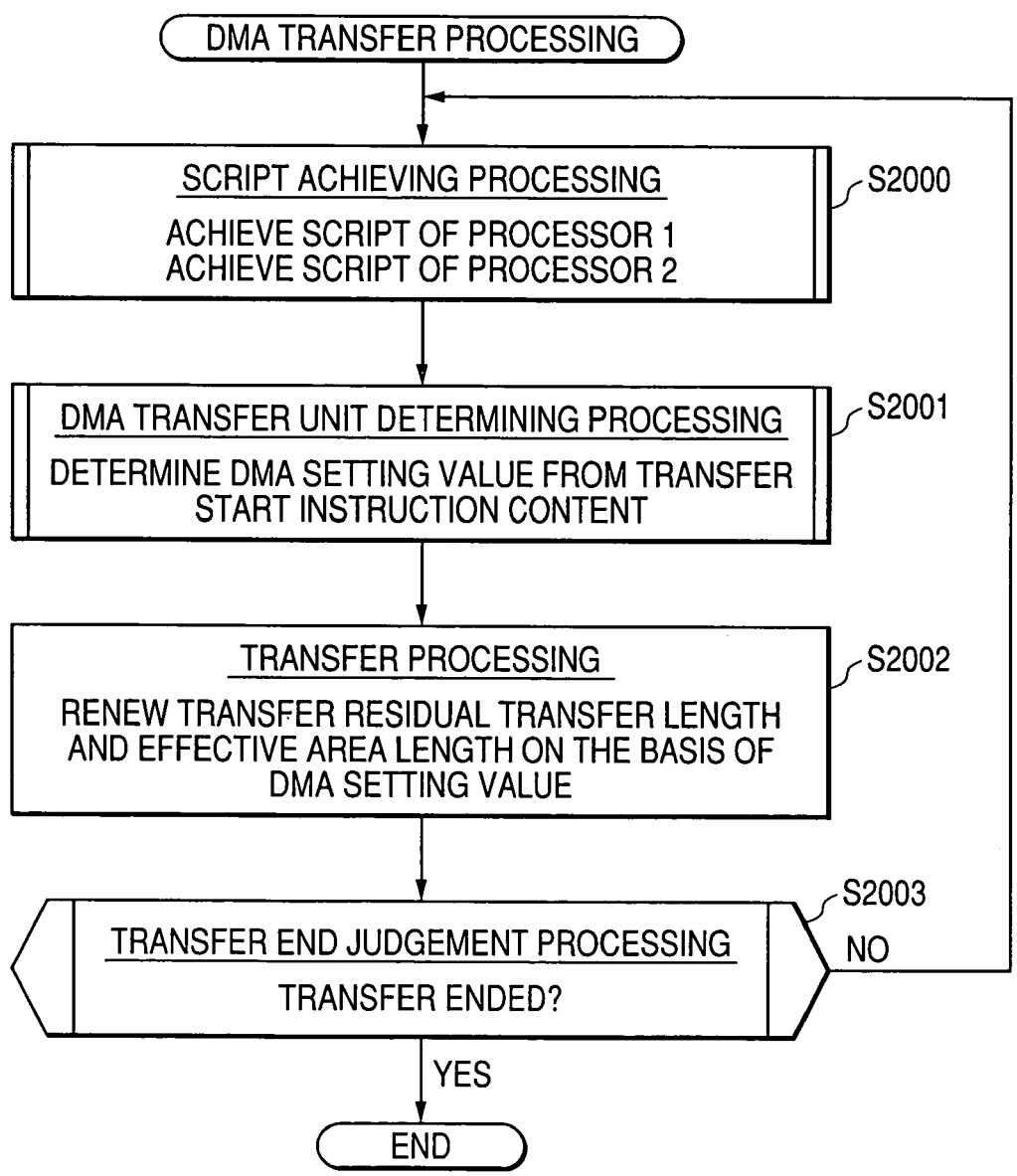
FIG. 20 is a flowchart showing the flow of the DMA transfer processing according to the embodiment.

In FIG. 19, the processor 2 (112) secures the data area (S1000). The securement of the data are means that the writing data transmitted from the information processing device 200 is stored in the memory 2 (113). In the example of FIG. 24, the two 4 kB, data are stored in the memory 2 (113).

Subsequently, the processor 2 (112) creates the script for the processor 2 (S1001). Here, the processor 2 (112) creates two scripts for the processor 2 in connection with the two data stored in the memory 2 (113). FIG. 24 shows the creation of the script 0 for the processor 2 and the script 1 for the processor 2. "4 kB" is described as the area length in the script 0 for the processor 2, and a sequential Flag is set. Furthermore, "4 kB" is described as the area length in the script 1 for the processor 2, and no sequential Flag is set.

The processor 2 (112) transmits the data transfer request command to the processor 1 (119) (S1002). The data transfer command contains the identifier of the script for the processor 2 created in S1001, the request transfer length and the transfer direction. Here, "0" and "1" are transmitted as the identifier of the script for the processor 2, and "8 kB" is transmitted as the request transfer length. The transfer from the memory 2 (113) to the cache memory 130 is indicated as the transfer direction. The identifier of the script for the processor 2 transmitted from the processor 2 (112) to the processor 1 (119) may be set to be only "0".

Subsequently, the processor 1 (119) analyzes the data transfer command transmitted from the processor 2 (112) (S1003), thereby recognizing the number of the script for the processor 2, the request transfer length and the transfer direction.

The processor 1 (119) secures the data area having the size indicated by the request transfer length in the cache memory 130 (S1004). In FIG. 24, a 2 kB data area and a 6 kB data area are secured.

The processor 1 (119) creates the script for the processor 1 (S1005). Here the processor 1 (119) creates two scripts for the processor 1 in connection with the two data areas secured in the cache memory 130. In FIG. 24, it is shown that the script 0 for the processor 1 and the script 1 for the processor 1 are created. "2 kB" is described as the area length in the script 0 for the processor 1, and a sequential Flag is set. "6 kB" is described as the area length in the script 1 for the processor 1, and no sequential Flag is set.

Thereafter, the processor 1 (119) transmits to DMA 114 the transfer start information containing the request transfer length, the transfer direction, the identifier of the script 0 for the processor 2 and the identifier of the script 0 for the processor 1, and writes this data into the transfer start register 803 of DMA 114, thereby starting DMA 114 (S1006).

At this time, DMA 114 starts the DMA transfer processing (S1007).

Specifically, the DMA controller 801 first achieves the script 0 for the processor 1 and the script 0 for the processor 2 (S2000). The achievement of the scripts is carried out as shown in FIG. 21.

First, the DMA controller 801 calculates the storage address of the script 0 for the processor 1 in the memory 1 (117) from the identifier of the script 0 for the processor 1 described in the transfer start information transmitted from the processor 1 (119) and the size of the script for the processor 1 stored in the initializing register on the basis of the transfer start information (S3000). When the storage address of the script 0 for the processor 1 is calculated, the script 0 for the processor 1 is read out from the storage address concerned in the memory 1 (117) (S3001). Here, the DMA controller 801 describes the #0 area head address described in the script 0 for the processor 1 in the transfer destination address column of the transfer register 804. The script identifier "0" described in the script 0 for the processor 1 and "2 kB" described in the area length column are written in the execution script number column for the processor 1 and the effective area length column for the processor 1 in the script register 806, respectively (S3002).

Likewise, the DMA controller 801 calculates the storage address of the script 0 for the processor 2 in the memory 2 (113) from the identifier of the script 0 for the processor 2 described in the transfer start information transmitted from the processor 1 (119) and the script size for the processor 2 stored in the initializing register on the basis of the transfer start information (S3000). When the storage address of the script 0 for the processor 2 is calculated, the script 0 for the processor 2 is subsequently read out from the storage address concerned in the memory 2 (113) (S3001). Here, the DMA controller 801 sets the #0 area head address described in the script 0 for the processor 2 into the transfer source address column of the transfer register 804. The script identifier 0 described in the script 0 for the processor 2 and "4 kB" described in the area length column are written in the execution script is number column for the processor 2 and the effective area length column for the processor 2 in the script register 806, respectively (S3002).

Subsequently, the DMA controller 801 determines the transfer unit (S2001). The determination of the transfer unit is carried out according to the flow shown in FIG. 22.

First, the DMA controller 801 writes the request transfer length "8 kB" into the residual transfer length column of the transfer register 804 (S4000).

Subsequently, the effective area length "2 kB" of the processor 1 in the script register 806 is compared with the effective area length "4 kB" of the processor 2 in the script register 806 (S4001). In this case, the latter effective length is large and thus the processing goes to "Yes". Then, the effective area length "2 kB" of the processor 1 is compared with the residual transfer length "8 kB" (S4002). In this case, the latter length is larger, and thus the processing goes to "Yes". Accordingly, the effective length "2 kB" of the processor 1 is determined as the transfer unit (S4003).

The DMA controller 801 transfers to the transfer destination address the data stored in the transfer source address stored in the transfer register 804, the data amount of the data thus transferred corresponding to only the data size of the transfer unit (S2002). That is, in this case, the data of the memory 2 (113) is transferred to the cache memory 130 by only 2 kB.

During execution of the transfer, the transfer source address of the transfer register 804, the transfer destination register and the residual transfer length are successively renewed, and the effective area length for the processor 2 and the effective area length for the processor 1 in the script register 806 are successively reduced for every data amount corresponding to the size of the transferred data.

When the effective area length for the processor 2, the effective area for the processor 1 or the residual transfer length in the script register 806 is equal to zero, the DMA controller 801 carries out the transfer end judgment processing (S2003). At this time point, the effective area length for the processor 1 in the script register 806 is equal to zero, the effective area length for the processor 2 is equal to 2 kB, and the residual transfer length is equal to 6 kB (transfer request length 8 kB−transfer unit 2 kB).

The transfer end judgment processing is carried out according to the flow shown in FIG. 23. First, the DMA controller 801 checks the residual transfer length of the transfer register 804 (S5000). In this case, the residual transfer length is equal to 6 kB, and thus the processing goes to "Yes". It is checked whether the effective area length for the processor 1 in the script register 806 is equal to zero or not (S5001). As described above, the effective length for the processor 1 is equal to zero, and thus the processing goes to "No". Then, the start script number for the processor 1 of the transfer start register 803 is incremented (S5002). Specifically, the start script number for the processor 1 is set to 1.

Subsequently, the DMA controller 801 checks the effective area length for the processor 2 of the script register 806 (S5003). The effective area length for the processor 2 is equal to 2 kB as described above, and thus the processing goes to "Yes".

The DMA controller 801 carries out the processing of S2000 again. At this time, the DMA controller 801 reads out the script indicated by the start script number for the processor 1 in the transfer start register 803 which is renewed in S5002. That is, the DMA controller 801 reads out the script 1 for the processor 1 from the memory 1 (117) by executing the processing from S3000 to S3001. Then, the DMA controller 801 describes the #1 area head address described in the script 1 for the processor 1 into the transfer destination address column of the transfer register 804. The script identifier "1" described in the script 1 for the processor 1 and "6 kB" described in the area length column are described in the execution script number column for the processor 1 and the effective area length column for the processor 1 in the script register 806, respectively (S3002).

Figure 22:
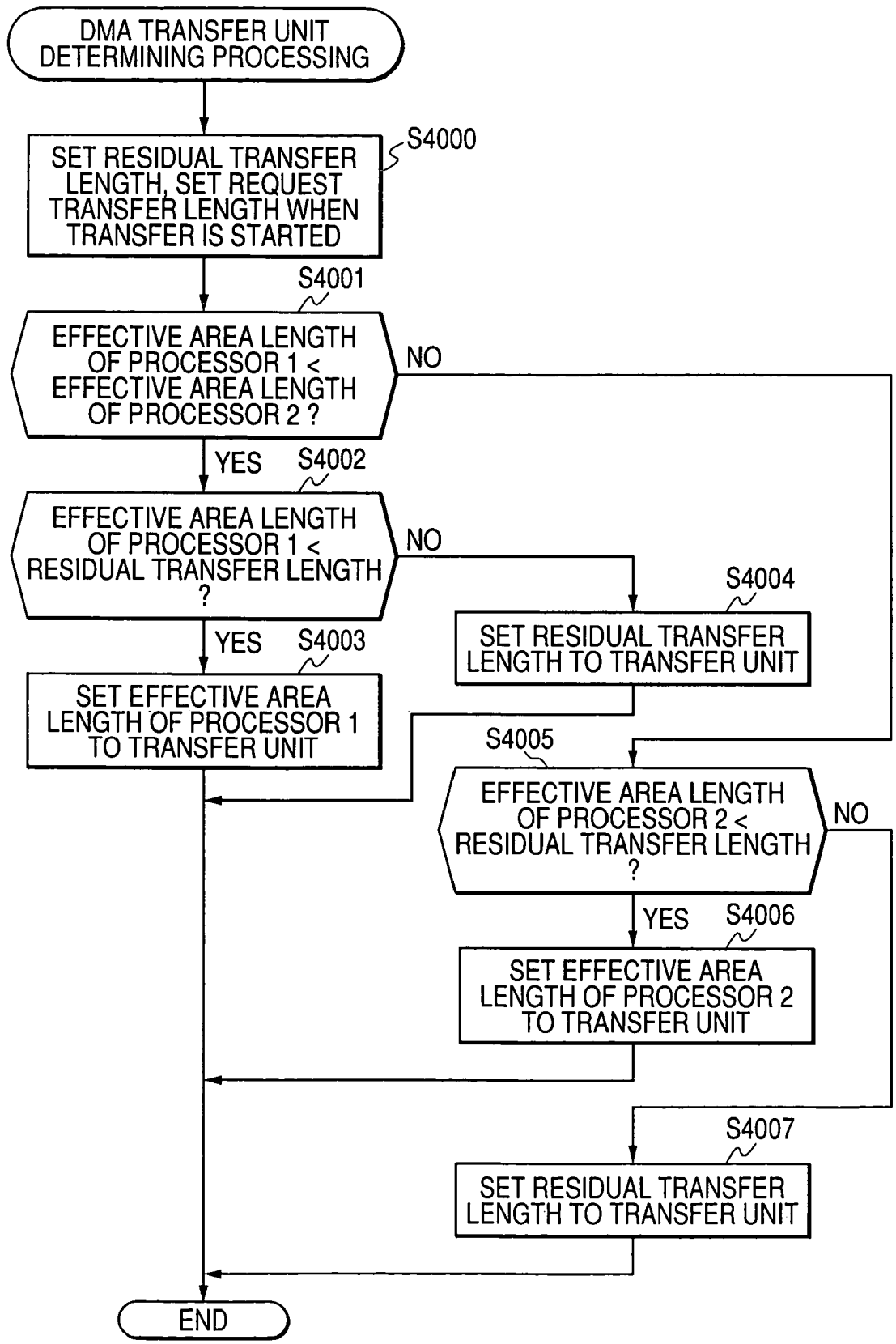
FIG. 22 is a flowchart showing the flow of the DMA transfer unit determining processing according to the embodiment.

Subsequently, the DMA controller 801 determines the transfer unit according to the flow of FIG. 22 (S2001).

At this time point, the residual transfer length column of the transfer register 804 is equal to 6 kB (S4000).

Subsequently, the DMA controller 801 compares the effective area length 6 kB of the processor 1 with the effective area length 2 kB of the processor 2 in the script register 806 (S4001). In this case, the former length is larger, and thus the processing goes to "No". Then, the effective area length 2 kB of the processor 2 is compared with the residual transfer length 6 kB (S4005). In this case, the latter length is larger, and thus the processing goes to "Yes". Accordingly, the effective area length 2 kB of the processor 2 is determined as the transfer unit (S4006).

The DMA controller 801 transfers the data stored at the transfer source address stored in the transfer register 804 to the transfer destination address by only the data size of the transfer unit (S2002). That is, the data of the memory 2 (113) is transferred to the cache memory 130 by only 2 kB.

During execution of the transfer, the transfer source address, the transfer destination address and the residual transfer length in the transfer source address of the transfer register 804 are successively renewed, and the effective area for the processor 2 and the effective area length for the processor 1 in the script register 806 are successively reduced every data amount corresponding to the size of the transferred data.

When the effective area length for the processor 2, the effective area length for the processor 1 or the residual transfer length in the script register 806 is equal to zero, the DMA controller 801 carries out the transfer end judgment processing (S2003). At this time point, the effective area length for the processor 2 of the script register 806 is equal to zero, the effective area length for the processor 1 is equal to 4 kB and the residual transfer length is equal to 4 kB (previous residual transfer length 6 kB—transfer unit 2 kB).

The transfer end judgment processing is carried out according to the flow shown in FIG. 23. First, the DMA controller 801 checks the residual transfer length of the transfer register 804 (S5000). In this case, the residual transfer length is equal to 4 kB, and thus the processing goes to "Yes". Then, it is checked whether the effective area length for the processor 1 of the script register 806 is equal to zero (S5001). The effective area length for the processor 1 is equal to 4 kB as described above, and thus the processing goes to "Yes". Then, it is checked whether the effective area length for the processor 2 of the script register 806 is equal to zero (S5003). The effective area for the processor 2 is equal to zero as described above, and thus the processing goes to "No", and the start script number for the processor 2 of the transfer start register 803 is incremented (S5004). Specifically, the start script number for the processor 2 is set to 1.

The DMA controller 801 executes the processing of S2000. At this time, the DMA controller 801 reads out the script indicated by the start script number for the processor 2 of the transfer start register 803 which is renewed in the S5004. That is, the DMA controller 801 reads out the script 1 for the processor 2 from the memory 2 (117) by executing the processing from S3000 to S3001. The DMA controller 801 sets the #1 area head address described in the script 1 for the processor 2 into the transfer source address column. The script identifier "1" described in the script 1 for the processor 2 and "4 kB" described in the area length column are described in the execution script number column for the processor 2 and the effective area length column for the processor 2 in the script register 806, respectively (S3002).

Subsequently, the DMA controller 801 determines the transfer unit according to the flow of FIG. 22 again (S2001).

At this time point, "4 kB" is described in the residual transfer length column of the transfer register 804 (S4000).

Subsequently, the DMA controller 801 compares the effective area length 4 kB of the processor I with the effective area length 4 kB of the processor 2 in the script register 806 (S4001). In this case, the former length is equal to the latter length, and thus the processing goes to "No". Then, the effective area length 4 kB of the processor 2 is compared with the residual transfer length 4 kB (S4005). In this case, the former length is also equal to the latter length, and thus the processing goes to "No". Accordingly, the residual transfer length 4 kB is determined as the transfer unit (S4007).

The DMA controller 801 transfers to the transfer destination address the data stored in the transfer source address stored in the transfer register 804, the data amount of the data concerned corresponding to only the data size of the transfer unit (S2002). That is, at this time, the data of the memory 2 (113) is transferred to the cache memory 130 by only 4 kB.

During execution of the transfer, the transfer source address, the transfer destination address and the residual transfer length in the transfer register 804 are successively renewed, and also the effective area length for the processor 2 and the effective area length for the processor 1 in the script register 806 are successively reduced for every amount corresponding to the size of the transferred data.

When the effective area length for the processor 2, the effective area length for the processor or the residual transfer length in the script register 806 is equal to zero, the DMA controller 801 carries out the transfer end judgment processing (S2003). At this time point, all of the effective area length for the processor 1 the effective area length for the processor 2 and the residual transfer length are equal to zero.

The transfer end judgment processing is carried out according to the flow shown in FIG. 23. Since the residual transfer length is equal to zero, the processing goes to "No", and the transfer processing is finished. The DMA controller 801 writes into the memory 1 (117) the end status in which the result of the transfer processing is described (S1008), and transmits an end notification to the processor 1 (119) (S1009). The processor 1 (119) reads out the end status from the memory 1 (117), and executes a processing corresponding to the content thereof (S1010). The processor 1 (119) transmits the end notification to the processor 2 (112) (S1011). The processor 2 (112) leaves open the storage area of the memory 2 (113) in which the writing data is stored.

The data transfer processing is carried out as, described above when a data writing request of 8 kB is issued from the information processing device 200.

Second Embodiment

Figure 25:
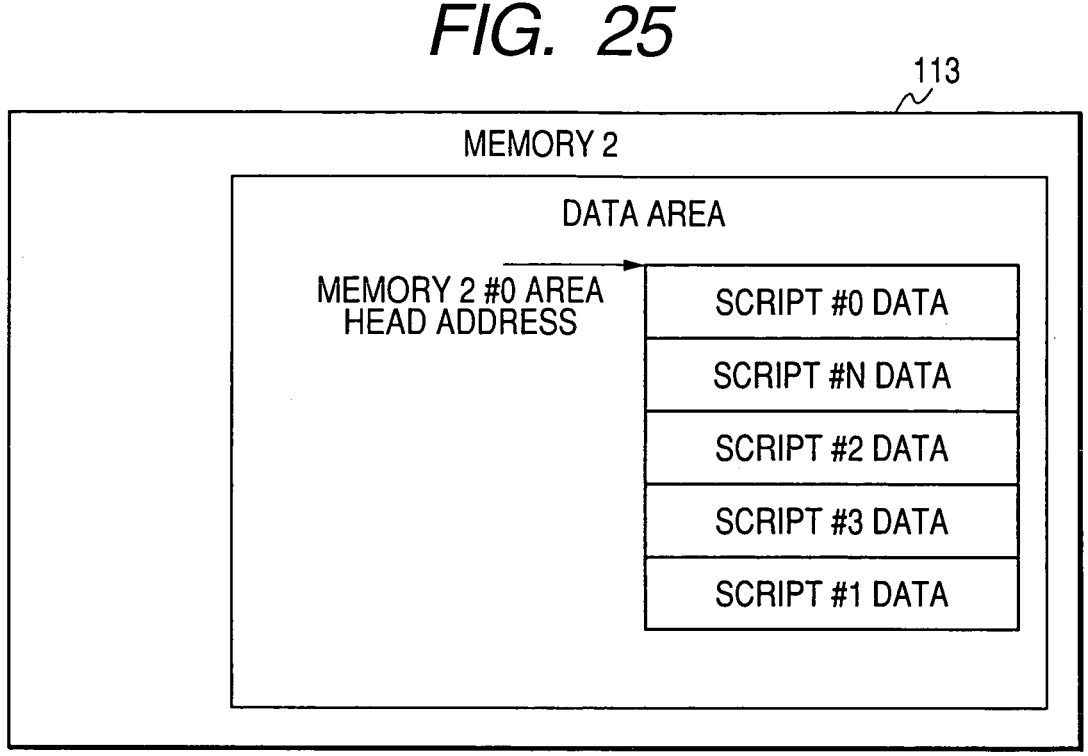
FIG. 25 is a diagram showing a memory 2 according to the embodiment.
Figure 26:
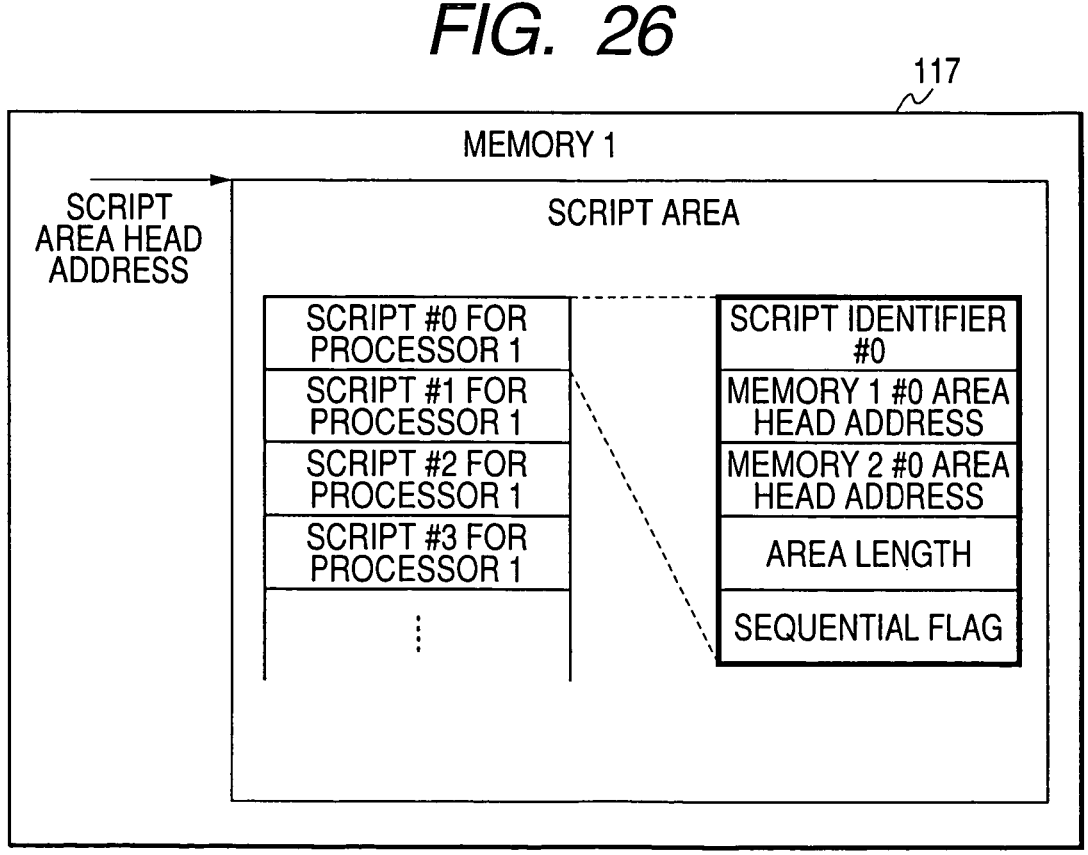
FIG. 26 is a diagram showing a memory 1 according to the embodiment.
Figure 27:
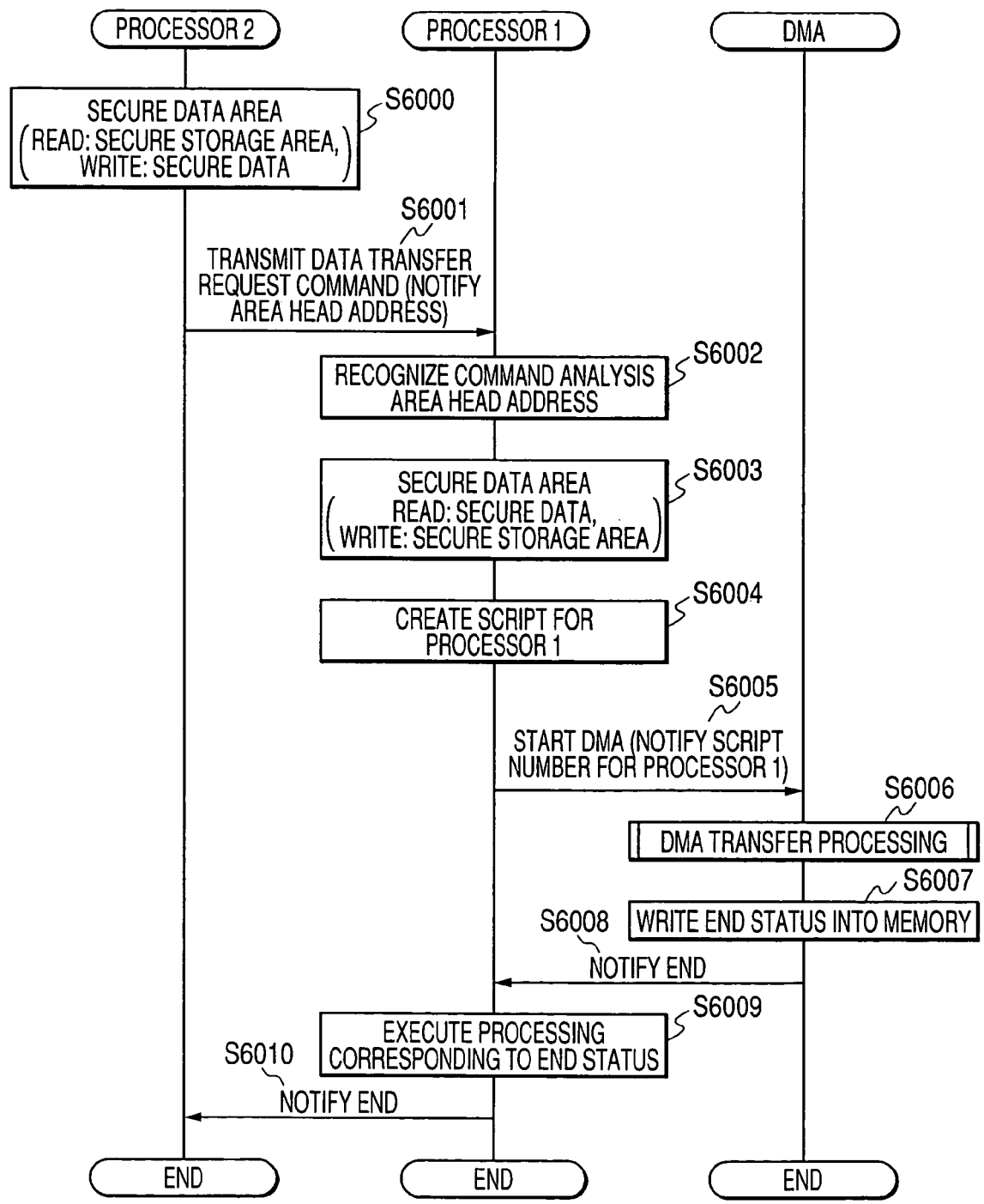
FIG. 27 is a flowchart showing the flow of the DMA transfer according to the embodiment.

The first embodiment may be modified like the second embodiment shown in FIGS. 25 to 27. In the second embodiment, the data transfer is carried out without using the script for the processor 2 in the first embodiment.

In this case, the transfer data is stored in the memory 2 (113), but the script for the processor 2 is not stored in the memory 1 (113) as shown in FIG. 25. In place of that, the area head address of the memory 2 (113) is stored in the script for the processor 1 of the memory 1 (117) as shown in FIG. 26.

The processing flow of the data transfer carried out between the memory 2 (113) and the cache memory 130 according to the second embodiment will be described with reference to the flowchart of FIG. 27.

The processor 2 (112) secures the data area (S6000). The securement of the data area means that when the file access request transmitted from the information processing device 200 is a read-out request, a storage area for storing the read-out data is secured in the memory 2 (113). When the file access request transmitted from the information processing device 200 is a reading request, the securement means that a storage area for storing read-out data is secured in the memory 2 (113).

The processor 2 (112) transmits the data transfer request command (the information indicating the storage position of the data in the second memory) to the processor 1 (119) (S6001). The data transfer request command contains the individual storage addresses of the data area secured in S1000, the data size of each data, the request transfer length and the transfer direction.

Thereafter, the processor 1 (119) analyzes the data transfer request command transmitted from the processor 2 (112) (S6002), there by recognizing the data size of the storage address of the data in the memory 2 (112), the request transfer length and the transfer direction.

Subsequently, the processor 1 (119) secures the data area having the size indicated by the request transfer length in the cache memory 130 (S6003).

The processor 1 (119) creates the script for the processor 1 in connection with each data area secured in the cache memory 130 (S6004), whereby the script for the processor 1 containing the information indicating the storage position of the data in the cache memory 130 and the information indicating the storage position of the data in the memory 2 (112) is written in the memory 1 (117).

Thereafter, the processor 1 (119) transmits the transfer start information containing the request transfer length, the transfer direction and the identifier of the script for the processor 1 to DMA 114, and writes this data into the transfer start register 803 of DMA 114, so that the processor 1 (119) starts the DMA 114 (S6005).

Accordingly, the DMA 114 starts the DMA transfer processing (S6006).

When the DMA transfer is finished, the DMA controller 801 writes into the memory 1 (117) the end status in which the result of the transfer processing is described (S6007), and it transmits an end notification to the processor 1 (119) (S6008).

The processor 1 (119) reads out the end status from the memory 1 (117) and executes the processing corresponding to the content thereof (S6009). The processor 1 (119) transmits the end notification to the processor 2 (112) (S6010).

When the file access request is a data read-out request, the processor 2 (112) may read out the read-out data transmitted to the data area of the memory 2 (113) and transmit the data to the information processing device 200. Furthermore, when the file access request is a data writing request, the processor 2 (112) leaves open the storage area of the memory 2 (113) in which the writing data are stored, so that the data can be used in other processing.

As described above, in the storage device controller 100 according to this embodiment, the information on the storage position of the data in the cache memory 130, etc. and the information on the storage position of the data in the memory 2 (113), etc. are written into the memory 1 (117) by the processor 1 (119). The DMA 114 reads out this information from the memory 1 (117) to carry out the data transfer. Accordingly, the idle time of the processor 1 (119) can be reduced, and the processor 1 (119) can be efficiently operated. Furthermore, the data reading/writing operation carried out in response to the file access request from the information processing device 200 can be increased.

Furthermore, according to the storage device controlling device 100 of this embodiment, even when the data size of the transfer source and the data size of the transfer destination are different from each other, the data transfer is controlled by DMA 114 without carrying out control by the processor 1 (119) and the processor 2 (112). Accordingly, the processing loads imposed on the processor 1 (119) and the processor 2 (113) can be reduced, and the speed of the data reading/writing operation carried out in response to the file access request from the information processing device 200 can be increased.

Furthermore, in the storage device controlling device 100 of this embodiment, the end status is not written in the register of the DMA 114, but is written in the memory 1 (117). The processor 1 (119) reads out the end status from the memory 1 (117), so that the reading time of the end status by the processor 1 (119) can be shortened. Therefore, the idle time of the processor 1 (119) can be reduced, whereby the speed of the data reading/writing operation carried out in response to the file access request from the information processing device 200 also can be increased.

In S1006, the transfer start information transmitted from the processor 1 (119) to the DMA 114 is set not to contain the identifier of the script for the processor 1. In this case, for example, the processor 1 (112) is designed to store the identifier of the script for the processor 1 at a predetermined storage position in the memory 1 (117), and the DMA 114 is designed to read out the identifier of the script for the processor 1 from the storage position concerned before the DMA transfer processing in S6006 is started.

Third Embodiment

Figure 28:
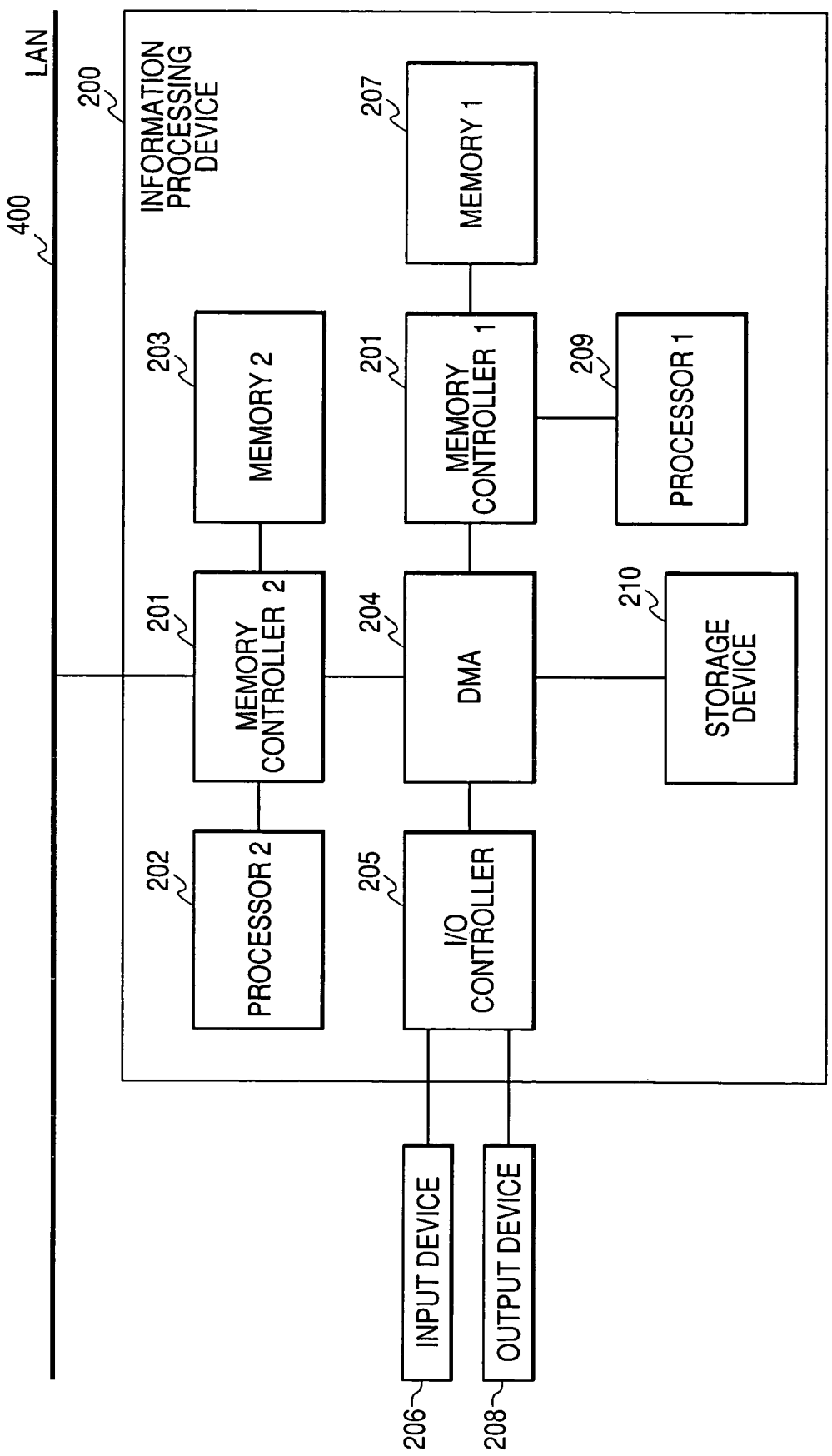
FIG. 28 is a block diagram showing the construction of an information processing device according to the embodiment.

Furthermore, a third embodiment shown in FIG. 28 may be implemented. That is, in the third embodiment, the same DMA transfer as the first embodiment or the second embodiment is implemented in the information processing device 200, such as a computer or the like, which is connected to a network, such as LAN 400 or the like.

The information processing device 200 is equipped with a processor 1 (first processor) 209, a processor 2 (second processor) 202, DMA (data transfer device) 204, a memory 1 (third memory) 207, a memory 2 (second memory) 203, a memory controller 1 (201), a memory controller 2 (201), an I/O controller 205 and a storage device (first memory) 210.

The processor 2 (202), the memory 2 (203) and the memory controller 2 (201) provides a communication interface function for carrying out communications with other information processing devices 200 through LAN 400. For example, the communication interface function will enable reception of a file access request transmitted from another information processing device 200 through LAN 200 according to the TCP/IP protocol and effect control of the transmission/reception of data.

The processor 2 (202) carries out the overall control of the information processing device 200 by executing various programs stored in the memory 2 (203). Various programs and data are stored in the memory 2 (203). For example, data transmitted/received to/from the other information processing devices 200 through LAN 400 are stored in the memory 2 (203).

The storage addresses (storage positions) of data stored in the memory 2 (203) are managed by the processor 2 (202).

The processor 1 (209), the memory 1 (207), the DMA 204 and the memory controller 1 (201) transmit/receive data and commands to/from the storage device 210 and the I/O controller 205. The processor 1 (209) makes DMA 114 execute transfer of the data stored in the memory 2 (203) to the storage device 210 and transfer of the data stored in the storage device 210 to the memory 2 (203). That is, the data transfer between the memory 2 (203) and the storage device 210 is carried out by the DMA 204. The processor 1 (209) makes the DMA 114 execute transfer of the data stored in the memory 2 (203) to the I/O controller 205 and transfer of the data stored in the I/O controller 205 to the memory 2 (203). Furthermore, the processor 1 (209) manages the storage addresses (storage positions) of the data stored in the storage device 210 and the I/O controllers 205, and the storage addresses (storage positions) of the data stored in the memory 1 (207).

The I/O controller 205 is connected to an input device 206 and an output device 207, and it controls the transmission/reception of data between each of the input device 206 and the output device 207 and the information processing device 200. The input device 206 is used to input data to the information processing device 200 by an operator operating the information processing device 200, etc. A keyboard, a mouse or the like is used as the input device 206. The output device 207 is a device for outputting information to the external. A display, a printer or the like is used as the output device 207. The storage device 210 may be a hard disk device, a semiconductor storage device or the like. As shown in FIG. 28, the storage device 210 may be equipped so as to be installed in the information processing device 200 or equipped at the external.

In the information processing device 200 of the third embodiment, the same DMA transfer as the first embodiment or the second embodiment is carried out between the memory 2 (203) and the storage device 210, between the memory 2 (203) and the I/O controller 205 or between the I/O controller 205 and the storage device 210, whereby the idle time of the processor 1 (209) can be reduced and the processing efficiency can be enhanced. Accordingly, the speed of the data reading/writing from/into the storage device 210 or the speed of the data input/output to/from the input device 206/the output device 208 can be increased.

Various embodiments for implementing the present invention have been described, and these embodiments are described in such a way as to make the understanding of the present invention easy. Therefore, the present invention should not be interpreted as being limited to these embodiments. That is, the above embodiments may be changed or improved without departing from the subject matter of the present invention, and the present invention may contain equivalents to the above-described embodiments.

What is claimed is:

1. A storage system comprising:
    a storage controller for controlling the storage system; and
    at least one disk device for storing data from said storage controller,
    wherein said storage controller comprises:
    a channel controller for receiving a file access input/output (I/O) writing request based on a file-name indication, writing data from an information processing device through a network and outputting a block access I/O write request corresponding to the file access I/O writing request, a disk controller for writing the writing data into a storage volume in which data are stored based on the block access I/O write request, a first memory including a cache memory for temporarily storing the writing data transmitted/received between the channel controller and the disk controller, and a data transfer network connected to said channel controller, said disk controller and said first memory, wherein the channel controller contains a first processor for outputting the block access I/O write request corresponding to the file access I/O writing request and controlling the first memory, a file access circuit which has a second processor and a second memory controlled by the second processor and serves to receive the file access I/O writing request and the writing data from the information processing device, a data transfer device for controlling the data transfer between the first memory and the second memory, and a third memory controlled by the first processor, which are formed on a circuit module, and wherein the first processor writes into the third memory first data transfer information containing information indicating the storage position of the writing data in the first memory, the second processor writes into the second memory second data transfer information containing information indicating the storage position of the writing data in the second memory and transmits information indicating the storage position of the second data transfer information to the first processor, the first processor transmits the data transfer device transfer start information containing information indicating the storage position of the first data transfer information and information indicating the storage position of the second data transfer information, the data transfer device reads out the second data transfer information from the second memory based on the transfer start information, reads out the first data transfer information from the third memory based on the transfer start information and transfers the writing data from the second memory to the first memory based on the first data transfer information and the second data transfer information, and the disk controller writes into the storage volume the writing data stored in the first memory on the basis of the write request.

2. A storage system comprising:

a storage controller for controlling the storage system; and at least one disk device for storing data from said storage controller, wherein said storage controller comprises:

a channel controller for receiving a file access input/output (I/O) read-out request based on a file-name indication from an information processing device through a network, transmitting to the information processing device read-out data read out from a storage volume for storing data and outputting a block access I/O read request corresponding to the file access I/O read-out request, a disk controller for reading out the read-out data from the storage volume based on the block access I/O read request, a first memory including a cache memory for temporarily storing the read-out data transmitted/received for the storage volume between the channel controller and the disk controller, and a data transfer network connected to said channel controller, said disk controller and said first memory, wherein the channel controller comprises a first processor for outputting the block access I/O read request corresponding to the file access I/O read-out request and controlling the first memory, a file access circuit which has a second processor and a second memory for controlling the second processor and receives the file access I/O read-out request from the information processing device, a data transfer device for controlling the data transfer between the first memory and the second memory, and a third memory controlled by the first memory, which are formed on a circuit board, and wherein the disk controller writes into the first memory the read-out data read out from the storage volume based on the read request, the first processor writes into the third memory first data transfer information containing information indicating the storage position of the read-out data in the first memory, the second processor writes into the second memory second data transfer information containing information indicating the storage position of the read-out data in the second memory and transmits information indicating the storage position of the second data transfer information to the first processor, the first processor transmits to the data transfer device transfer start information containing information indicating the storage position of the first data transfer information and information indicating the storage position of the second data transfer information, the data transfer device reads out the second data transfer information from the second memory based on the transfer start information, reads out the first data transfer information from the third memory based on the transfer start information and transfers the read-out data from the first memory to the second memory on the basis of the first data transfer information and the second data transfer information, and the second processor transmits the read-out data stored in the second memory to the information processing device.

3. A control method for a storage system including a storage controller for controlling the storage system; and at least one disk device for storing data from said storage controller, wherein said storage controller comprises:

a channel controller for receiving a file access input/output (I/O) writing request based on a file-name indication, writing data from an information processing device through a network and outputting a block access I/O write request corresponding to the file access I/O writing request, a disk controller for writing the writing data into a storage volume in which data are stored based on the block access I/O write request output by said channel controller, a first memory including a cache memory for temporarily storing the writing data transmitted/received between the channel controller and the disk controller, and a data transfer network connected to said channel controller, said disk controller and said first memory, the channel controller being equipped with a first processor for outputting the block access I/O write request corresponding to the file access I/O writing request and controlling the first memory, a file access circuit which has a second processor and a second memory controlled by the second processor and serves to receive the file access I/O writing request and the writing data from the information processing device, a data transfer device for controlling the data transfer between the first memory and the second memory, and a third memory controlled by the first processor, which are formed on a circuit module, said control method comprising the steps of:

writing, by the first processor, into the third memory first data transfer information containing information indicating the storage position of the writing data in the first memory;

by the second processor, writing into the second memory second data transfer information containing information indicating the storage position of the writing data in the second memory, and transmitting information indicating the storage position of the second data transfer information to the first processor;

transmitting, by the first processor, the data transfer device transfer start information containing information indicating the storage position of the first data transfer information and information indicating the storage position of the second data transfer information; and by the data transfer device, reading out the second data transfer information from the second memory based on the transfer start information, reading out the first data transfer information from the third memory based on the transfer start information, and transferring the writing data from the second memory to the first memory based on the first data transfer information and the second data transfer information; and writing, by the disk controller into the storage volume the writing data stored in the first memory based on the write request.

4. A control method for a storage system including a storage controller for controlling the storage system; and at least one disk device for storing data from said storage controller, wherein said storage controller comprises:

a channel controller for receiving a file access input/output (I/O) read-out request based on a file-name indication from an information processing device through a network, transmitting to the information processing device read-out data readout from a storage volume for storing data and outputting a block access I/O read request corresponding to the file access I/O read-out request, a disk controller for reading out the read-out data from the storage volume based on the block access I/O read request output by said channel controller, a first memory including a cache memory for temporarily storing the read-out data transmitted/received between the channel controller and the disk controller, a data transfer network connected to said channel controller, said disk controller and said first memory, the channel controller being equipped with a first processor for outputting the block access I/O read request corresponding to the file access I/O read-out request and controlling the first memory, a file access circuit which has a second processor and a second memory for controlling the second processor and receives the file access I/O read-out request from the information processing device, a data transfer device for controlling the data transfer between the first memory and the second memory, and a third memory controlled by the first memory, which are formed on a circuit module, said control method comprising the steps of:

writing, by the disk controller, into the first memory the read-out data readout from the storage volume based on the read request;

writing, by the first processor, into the third memory first data transfer information containing information indicating the storage position of the read-out data in the first memory;

by the second processor, writing into the second memory second data transfer information containing information indicating the storage position of the read-out data in the second memory and transmitting information indicating the storage position of the second data transfer information to the first processor;

transmitting, by the first processor, to the data transfer device transfer start information containing information indicating the storage position of the first data transfer information and information indicating the storage position of the second data transfer information;

by the data transfer device, reading out the second data transfer information from the second memory based on the transfer start information, reading out the first data transfer information from the third memory based on the transfer start information and transferring the read-out data from the first memory to the second memory based on the first data transfer information and the second data transfer information; and transmitting, by the second processor the read-out data stored in the second memory to the information processing device.

* * * * *